United States Patent
Hozouri

(10) Patent No.: US 10,211,524 B2
(45) Date of Patent: Feb. 19, 2019

(54) ANTENNA ISOLATION SYSTEMS AND METHODS

(71) Applicant: QUALCOMM Incorporated, San Diego, CA (US)

(72) Inventor: Behzad Tavassoli Hozouri, Portland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/492,945

(22) Filed: Apr. 20, 2017

(65) Prior Publication Data

US 2017/0222315 A1   Aug. 3, 2017

Related U.S. Application Data

(63) Continuation-in-part of application No. PCT/US2016/041405, filed on Jul. 7, 2016, and a continuation-in-part of application No. PCT/US2016/043765, filed on Jul. 22, 2016, and a continuation-in-part of application No. 15/419,929,
(Continued)

(51) Int. Cl.
| | |
|---|---|
| H01Q 1/52 | (2006.01) |
| H04B 17/27 | (2015.01) |
| H04B 7/06 | (2006.01) |
| H04W 72/08 | (2009.01) |
| H04W 16/28 | (2009.01) |

(52) U.S. Cl.
CPC .......... *H01Q 1/523* (2013.01); *H04B 7/0617* (2013.01); *H04B 17/27* (2015.01); *H04W 16/28* (2013.01); *H04W 72/085* (2013.01)

(58) Field of Classification Search
CPC .. H01Q 1/521; H01Q 15/0006; H01Q 1/3233; H01Q 15/14; H01Q 3/46; H01Q 1/523
USPC ........ 455/509, 556.1, 557, 575.7, 550.1, 73, 455/426.1, 426.2; 343/893, 702, 754, 755
See application file for complete search history.

(56) References Cited

U.S. PATENT DOCUMENTS 7,369,879 B1 * 5/2008 Steigerwald ........... H01Q 1/521
                                                              343/851
9,100,074 B1   8/2015 Zhang et al.
(Continued)

FOREIGN PATENT DOCUMENTS

| JP | H04147079 A | 5/1992 |
|---|---|---|
| WO | WO-2012156570 A1 | 11/2012 |

(Continued)

*Primary Examiner* — Keith Ferguson
(74) *Attorney, Agent, or Firm* — Holland & Hart LLP/Qualcomm

(57) ABSTRACT

Systems and methods for enhanced antenna isolation are disclosed. An example antenna isolation system includes a first antenna element of an antenna array configured to transmit or receive wireless transmissions, a second antenna element of the antenna array adjacent to the first antenna element in the antenna array, and a scattering structure disposed substantially between the first and second antenna elements. The scattering structure is configured to reduce electromagnetic coupling between the first and second antenna elements by, at least in part, directing electromagnetic radiation coupled through the first antenna element away from the second antenna element.

14 Claims, 11 Drawing Sheets

Related U.S. Application Data filed on Jan. 30, 2017, which is a continuation-in-part of application No. PCT/US2016/041405, filed on Jul. 7, 2016, and a continuation-in-part of application No. PCT/US2016/043766, filed on Jul. 22, 2016.

(60) Provisional application No. 62/326,406, filed on Apr. 22, 2016, provisional application No. 62/189,929, filed on Jul. 8, 2015, provisional application No. 62/198,326, filed on Jul. 29, 2015.

(56) References Cited

U.S. PATENT DOCUMENTS

| | | |
|---|---|---|
| 9,871,574 B2 | 1/2018 | Chen |
| 9,944,391 B2 | 4/2018 | Spengler et al. |
| 2005/0156780 A1 | 7/2005 | Bonthron et al. |
| 2005/0270229 A1 | 12/2005 | Stephens et al. |
| 2006/0094449 A1 | 5/2006 | Goldberg |
| 2006/0114157 A1 | 6/2006 | Kolanek et al. |
| 2007/0298742 A1 | 12/2007 | Ketchum et al. |
| 2008/0084350 A1 | 4/2008 | Uno et al. |
| 2008/0254752 A1 | 10/2008 | Oh et al. |
| 2009/0224960 A1 | 9/2009 | Ishii et al. |
| 2009/0309784 A1 | 12/2009 | Natsume |
| 2010/0054200 A1 | 3/2010 | Tsai et al. |
| 2010/0321234 A1 | 12/2010 | Goldman |
| 2011/0065448 A1 | 3/2011 | Song et al. |
| 2011/0105032 A1 | 5/2011 | Maruhashi et al. |
| 2011/0235533 A1 | 9/2011 | Breit et al. |
| 2013/0182666 A1 | 7/2013 | Sutskover et al. |
| 2014/0334566 A1 | 11/2014 | Kim et al. |
| 2015/0015448 A1* | 1/2015 | Almog .................. H01Q 1/521 343/810 |
| 2015/0030094 A1 | 1/2015 | Zhang |
| 2016/0087695 A1 | 3/2016 | Wang |
| 2016/0233178 A1 | 8/2016 | Lamy et al. |
| 2016/0277094 A1 | 9/2016 | Ying et al. |
| 2017/0029107 A1 | 2/2017 | Emami et al. |
| 2017/0033468 A1* | 2/2017 | Wong .................... H01P 1/2005 |
| 2017/0041895 A1 | 2/2017 | Gan et al. |
| 2017/0059688 A1 | 3/2017 | Gan et al. |
| 2017/0141830 A1 | 5/2017 | Cheng et al. |
| 2017/0142605 A1 | 5/2017 | Cheng et al. |
| 2018/0025651 A1 | 1/2018 | Anderson |
| 2018/0157255 A1 | 6/2018 | Halverson et al. |
| 2018/0210075 A1 | 7/2018 | Kim et al. |

FOREIGN PATENT DOCUMENTS

| | | |
|---|---|---|
| WO | WO-2013085468 A1 | 6/2013 |
| WO | WO-2014074894 A1 | 5/2014 |

* cited by examiner

ANTENNA ISOLATION SYSTEMS AND METHODS

CROSS-REFERENCE TO RELATED APPLICATIONS

This application claims the benefit of and priority to U.S. Provisional Patent Application No. 62/326,406 filed on Apr. 22, 2016 and entitled "ANTENNA ISOLATION," which is hereby incorporated by reference in its entirety.

This application is also a continuation-in-part of International Patent Application No.: PCT/US2016/041405 filed on Jul. 2, 2016, and entitled "SYSTEMS AND METHODS OF INTERFERENCE MITIGATION FOR CONCURRENT LINKS IN BEAMFORMED COMMUNICATION," which is hereby incorporated by reference in its entirety. International Patent Application PCT/US2016/041405 claims the benefit of and priority to U.S. Provisional Patent Application No. 62/189,929 filed on Jul. 8, 2015 and entitled "SYSTEMS AND METHODS OF INTERFERENCE MITIGATION FOR CONCURRENT LINKS IN BEAMFORMED COMMUNICATION," which is hereby incorporated by reference in its entirety.

This patent application is also a continuation-in-part of International Patent Application No. PCT/US2016/043765 filed on Jul. 22, 2016 and entitled "ANGLE AND POSITION SENSING USING ARRAYS OF ANTENNAS," which is hereby incorporated by reference in its entirety. International Patent Application PCT/US2016/043765 claims the benefit of and priority to U.S. Provisional Patent Application 62/198,326 filed Jul. 29, 2015 and entitled "WIRELESS CONTROL OF DRONE WITH DISTANCE RANGING AND CHANNEL SENSING," which is hereby incorporated by reference in its entirety.

This patent application is also a continuation-in-part of U.S. patent application Ser. No. 15/419,929 filed on Jan. 30, 2017 and entitled "BEAMFORMING BASED ON ADJACENT BEAMS SYSTEMS AND METHODS," which is hereby incorporated by reference in its entirety. U.S. patent application Ser. No. 15/419,929 is a continuation-in-part of International Patent Application No. PCT/US2016/041405 filed on Jul. 7, 2016 and entitled "SYSTEMS AND METHODS OF INTERFERENCE MITIGATION FOR CONCURRENT LINKS IN BEAMFORMED COMMUNICATION," which claims the benefit of and priority to U.S. Provisional Patent Application No. 62/189,929 filed on Jul. 8, 2015 and entitled "SYSTEMS AND METHODS OF INTERFERENCE MITIGATION FOR CONCURRENT LINKS IN BEAMFORMED COMMUNICATION," which are all hereby incorporated by reference in their entirety. U.S. patent application Ser. No. 15/419,929 is also a continuation-in-part of International Patent Application No. PCT/US2016/043765 filed on Jul. 22, 2016 and entitled "ANGLE AND POSITION SENSING USING ARRAYS OF ANTENNAS," which claims the benefit of and priority to U.S. Provisional Patent Application No. 62/198,326 filed on Jul. 29, 2015 and entitled "WIRELESS CONTROL OF DRONE WITH DISTANCE RANGING AND CHANNEL SENSING," which are all hereby incorporated by reference in their entirety. U.S. patent application Ser. No. 15/419,929 is also a continuation-in-part of International Patent Application No. PCT/US2016/043766 filed on Jul. 22, 2016 and entitled "ANGULAR VELOCITY SENSING USING ARRAYS OF ANTENNAS," which claims the benefit of and priority to U.S. Provisional Patent Application No. 62/198,326 filed on Jul. 29, 2015 and entitled "WIRELESS CONTROL OF DRONE WITH DISTANCE RANGING AND CHANNEL SENSING," which are all hereby incorporated by reference in their entirety.

TECHNICAL FIELD

The present disclosure relates generally to wireless communication devices, and in particular, to multiple-antenna systems and/or beamforming architectures with enhanced antenna-antenna isolation.

BACKGROUND

There is continuing interest in miniaturizing wireless communication devices, including their antenna systems. Therefore, such antennas and constituent antenna elements are typically closely packed. The small distance between the antennas has the potential to affect not only their radiation pattern, but also the mutual coupling between them, hence increasing the risk of interference and performance degradation.

Prior art solutions do not provide satisfactory decoupling or are difficult to implement. For example, electromagnetic bandgap structures typically require a relatively large area, which goes against the miniaturization of the antenna systems. Decoupling networks are also too large, are not wideband enough, or do not improve isolation sufficiently. Some prior approaches use resonant parasitic elements to try to decouple two closely spaced antennas by creating an extra coupling field through the parasitic elements that attempts to cancel out the direct coupling field between the two antennas and suppress the mutual coupling between them, but this approach is inherently narrow band and frequency sensitive (i.e., a design for operation at one resonant frequency is generally not applicable to operation at different non-resonant frequencies), requires a relatively complex and expensive design process, and, at best, typically results in relatively poor antenna-antenna isolation.

Thus, there is a need in the art for a compact and inexpensive-to-implement yet relatively effective wideband antenna isolation system.

SUMMARY

The described techniques relate to devices, methods, systems, or apparatuses that support enhanced antenna isolation in multiple element antenna systems, such as beamforming antenna arrays. For example, antenna isolation between two or more closely spaced antenna elements in a wireless communication device can be improved by including a scattering structure disposed between the antenna elements. The scattering structure weakens the electromagnetically coupled currents between the antenna elements by at least partially reflecting and redirecting (e.g., scattering) their radiated power, thereby allowing the antenna elements to be placed or formed closer together and to operate reliably at higher signal levels without risk of negatively impacting overall performance.

According to a first set of examples, a device includes a first antenna element of an antenna array configured to transmit or receive wireless transmissions, a second element of the antenna array adjacent to the first antenna element in the antenna array, and a scattering structure disposed substantially between the first and second antenna elements, wherein the scattering structure is configured to reduce electromagnetic coupling between the first and second antenna elements by, at least in part, directing electromagnetic radiation coupled through the first antenna element away from the second antenna element.

The scattering structure may include one or more scattering elements configured to reflect the electromagnetic radiation coupled through the first antenna element away from the second antenna element. The one or more scattering elements may be further configured to reduce resonance electromagnetic resonance between the first and second antenna elements.

The first and second antenna elements may include respective first and second planar antenna elements formed from a common substrate; and the scattering structure may be formed from the common substrate. The common substrate may include a multilayer substrate. The first and second planar antenna elements may include respective first and second multilayer planar antenna elements formed from at least one common conductive metal layer of the multilayer substrate. The scattering structure may be formed, at least in part, from the at least one conductive metal layer of the multilayer substrate.

The scattering structure may include a multilayer scattering element. A first conductive metal layer of the multilayer scattering element is electrically coupled to a second conductive metal layer of the multilayer scattering element by at least one filled via. The first conductive metal layer of the multilayer scattering element may be electrically coupled to the second conductive metal layer of the multilayer scattering element by a plurality of filled vias.

The scattering structure may include a plurality of scattering elements. The plurality of scattering elements may be arranged in one of: a parallel arrangement, a mirror arrangement, a singular arrangement, or a combination thereof.

The first antenna element may be one of a first plurality of antenna elements, and the second antenna element may be one of a second plurality of antenna elements. The scattering structure may be configured to reduce electromagnetic coupling between the first plurality of antenna elements and the second plurality of antenna elements by, at least in part, directing electromagnetic radiation coupled through the first plurality of antenna elements away from the second plurality of antenna elements.

According to a second set of examples, a method for detecting an object may include designating a plurality of transmitter and receiver channels for a transmitter antenna array and a receiver antenna array of an object sensing system, wherein a scattering structure is disposed substantially between the transmitter antenna array and the receiver antenna array; scanning the transmitter antenna array and the receiver antenna array through the designated channels to measure channel responses corresponding to each one of the designated channels; and determining a directional vector to or from an object scanned by at least one of the designated channels based, at least in part, on the measured channel responses.

In some examples, a measurement matrix comprising entries corresponding to each measured channel response may be formed, wherein the designating the plurality of transmitter and receiver channels includes forming a transmitter amplitude weight vector (AWV) matrix comprising one or more transmitter AWVs corresponding to each transmitter channel in the plurality of transmitter and receiver channels, and forming a receiver AWV matrix comprising one or more receiver AWVs corresponding to each receiver channel in the plurality of transmitter and receiver channels.

According to a third set of examples, a method for forming a wireless communication channel includes selecting a plurality of test beam antenna weight vectors (AWVs) configured to detect a responder device; receiving one or more channel measurement responses corresponding to the plurality of test beam AWVs; determining a combined beam AWV directed substantially towards the responder device based at least in part on the plurality of test beam AWVs and the one or more channel measurement responses; and configuring an antenna sub-system to form a wireless communication channel according to the determined combined beam AWV between the wireless networking device and the responder device.

Individual weight factors corresponding to each of the plurality of test beam AWVs may be determined based, at least in part, on the one or more channel measurement responses. A vector sum of the plurality of test beam AWVs weighted according to their corresponding individual weight factors may be determined.

According to a fourth set of examples, a method for forming a wireless communication device includes forming a first antenna element of the antenna array from a substrate; forming a second antenna element of the antenna array from the substrate and adjacent to the first antenna element in the antenna array; and forming a scattering structure substantially between the first and second antenna elements, wherein the scattering structure is configured to reduce electromagnetic radiation coupled through the first antenna element away from the second antenna element.

According to a fifth set of examples, a wireless communication device includes an antenna sub-system configured to transmit beamformed wireless transmissions, wherein the antenna sub-system comprises a first antenna element, a second antenna element adjacent to the first antenna element, and a scattering structure disposed substantially between the first and second antenna elements, wherein the scattering structure is configured to reduce electromagnetic coupling between the first and second antenna elements by, at least in part, directing electromagnetic radiation coupled through the first antenna element away from the second antenna element; a controller configured to communicate with the antenna sub-system; and a memory. The memory may be configured to store a plurality of computer readable instructions which when executed by the controller are adapted to cause the system to: select a plurality of test beam antenna weight vectors (AWVs) configured at least to detect, to localize, or to detect and localize a responder device; receive one or more channel measurement responses corresponding to the plurality of test beam AWVs; determine a combined beam AWV directed substantially towards the responder device based, at least in part, on the plurality of test beam AWVs and the corresponding one or more channel measurement responses; and configure the antenna sub-system to form a wireless communication channel according to the determined combined beam AWV between the wireless networking device and the responder device.

Determining the combined beam AWV may include determining individual weight factors corresponding to each of the plurality of test beam AWVs based, at least in part, on the one or more channel measurement responses; and determining a vector sum of the plurality of test beam AWVs weighted according to their corresponding individual weight factors.

The scattering structure may include one or more scattering element characteristics configured substantially to reflect the electromagnetic radiation coupled through the first antenna element away from the second antenna element and to substantially eliminate risk of resonance with the electromagnetic radiation coupled through the first antenna element.

According to a sixth set of examples, a system for detecting an object includes a transmitter coupled to a transmitter antenna array, wherein the transmitter is configured to apply amplitude weight vectors to signals provided to the transmitter antenna array to form corresponding transmitter channels using one or more antenna elements of the transmitter antenna array; a receiver coupled to a receiver antenna array, wherein the receiver is configured to apply amplitude weight vectors to signals provided to the receiver antenna array to form corresponding receiver channels using one or more antenna elements of the receiver antenna array, and wherein the transmitter antenna array or the receiver antenna array comprises a first antenna element, a second antenna element adjacent to the first antenna element, and a scattering structure disposed substantially between the first and second antenna elements, wherein the scattering structure is configured to reduce electromagnetic coupling between the first and second antenna elements by, at least in part, directing electromagnetic radiation coupled through the first antenna element away from the second antenna element; a controller configured to communicate with the transmitter and the receiver; and a memory configured to store a plurality of computer readable instructions. When executed by the controller, the computer readable instructions are adapted to cause the system to designate a plurality of transmitter and receiver channels for the transmitter antenna array and the receiver antenna array; scan the transmitter antenna array and the receiver antenna array through the designated channels to measure channel responses corresponding to each one of the designated channels; and determine a directional vector to or from an object scanned by at least one of the designated channels based, at least in part, on the measured channel responses.

The computer readable instructions may be further adapted to cause the system to forming a measurement matrix comprising entries corresponding to each measured channel response, wherein the designating the plurality of transmitter and receiver channels includes forming a transmitter amplitude weight vector (AWV) matrix comprising one or more transmitter AWVs corresponding to each transmitter channel in the plurality of transmitter and receiver channels, and forming a receiver AWV matrix comprising one or more receiver AWVs corresponding to each receiver channel in the plurality of transmitter and receiver channels.

The first and second antenna elements may include first and second planar antenna elements formed from a common substrate. The scattering structure also may be formed from the common substrate.

Figure 1A:
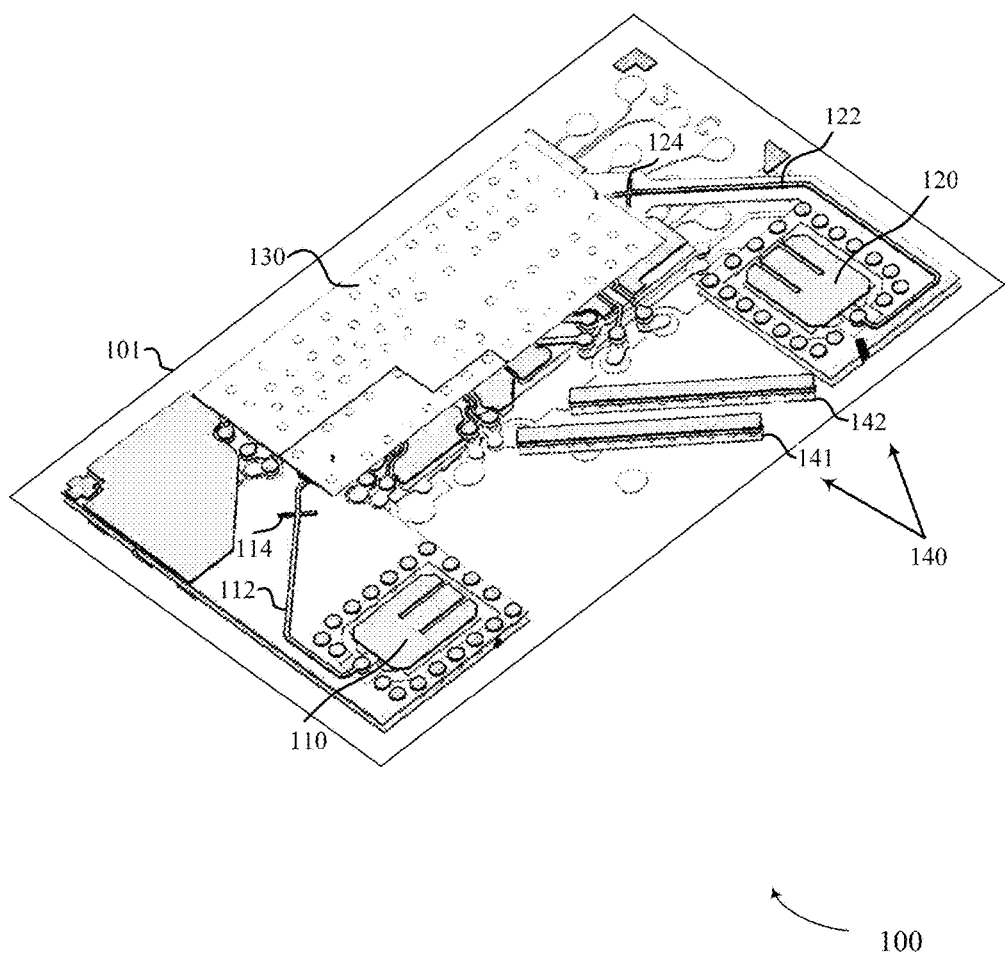
FIG. 1A is a schematic diagram illustrating an example of an antenna isolation system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for enhanced antenna to antenna isolation in multiple element antenna systems, such as beamforming antenna arrays. For example, implementations provide systems and methods of improving isolation between two or more closely spaced antenna elements in a wireless communication device by including a scattering structure disposed between them. The scattering structure weakens the electromagnetically coupled currents between the antenna elements by at least partially reflecting and redirecting (e.g., scattering) their radiated power, thereby allowing the antenna elements to be placed or formed closer together and/or to operate reliably at higher signal levels without risk of negatively impacting overall performance.

In some implementations, the antenna elements may have a generally multilayered structure formed on and inside a dielectric plate, such as a printed circuit board (PCB) substrate. A corresponding scattering structure may be implemented by one or more multilayered planar conductive structures or elements formed on or within the same substrate as the antenna elements, for example, and may include at least one connecting via formed within the same substrate, as described herein. Such scattering structures may be formed according to relatively simple shapes and/or design processes/constraints, and may be configured or arranged to reduce mutual coupling between antenna elements significantly over a relatively wide band, at least because such scattering structures do not require that constituent scattering elements resonate at the operating frequency of the antenna system, as is required by conventional resonant parasitic element approaches and their resulting relatively narrow band effects.

FIG. 1A is a schematic diagram illustrating an example of an antenna isolation system 100. As shown in FIG. 1A, system 100 may include antenna elements 110 and 120 and scattering structure 140 disposed between antenna elements 110 and 120. In various implementations, antenna elements 110 and 120 and scattering structure 140 may be substantially coplanar and/or formed from a common substrate 101. Also shown in FIG. 1A are various antenna system substructures configured to facilitate operation of antenna isolation system 100, including transmission lines 112 and 122, passive transmission structures 114 and 124, and antenna system interface 130.

In the implementation presented in FIG. 1A, antenna elements 110 and 120 are multilayer planar antennas formed on and/or within substrate 101. For example, antenna elements 110 and 120 may be implemented as directional and/or E-shaped microstrip or patch antennas with relatively wide band and/or multi-band characteristics and with various polarization (e.g., linear, circular, or other polarization) characteristics. In some implementations, antenna elements 110 and 120 may be implemented with orthogonal polarization characteristics relative to one another, which may correspond to their relative physical orientations. In other implementations, antenna elements 110 and 120 may be implemented as planar inverted-F antennas and/or other types or shaped or orientated planar antennas that can be formed from (e.g., on and/or within) substrate 101, and in some implementations be implemented differently from each other. More generally, antenna elements 110 and 120 may be configured to operate across the same, different, or partially overlapping frequency bands, to operate in the same or different modes (e.g., transmit or receive) at the same or different times, and/or to have the same or different polarization characteristics and/or orientations.

Substrate 101 may be implemented as a multi-layer substrate including one or more conductive metal layers and interstitial dielectric layers configured to facilitate formation of antenna elements 110 and 120 and/or other structures shown in FIG. 1A. For example, in the implementation shown in FIG. 1A, antenna elements 110 and 120 and scattering structure 140 may be formed/patterned on or within at least one common conductive metal or dielectric layer of substrate 101, such that antenna elements 110 and 120 and scattering structure 140 are substantially coplanar. In some implementations, substrate 101 may be implemented by a multilayer PCB including at least one conductive metal layer laminated to an adjoining dielectric layer.

Scattering structure 140 may be any conductive metal structure disposed substantially between antenna elements 110 and 120 that is configured to provide electromagnetic isolation of antenna elements 110 and 120 from each other and reduce electromagnetic coupling between antenna elements 110 and 120 by reflecting, redirecting, and/or otherwise decoupling power radiated or received by antenna element 110 from antenna element 120 and power radiated or received by antenna element 120 from antenna element 110. In the implementation presented in FIG. 1A, scattering structure 140 includes scattering elements 141 and 142 formed from substrate 101. For example, as shown in FIG. 1A, scattering elements 141 and 142 may be implemented by multiple conductive metal layers of substrate 101 electrically coupled to each other by one or more filled vias formed within substrate 101, and, in some implementations, may be substantially coplanar with antenna elements 110 and 120. In various implementations, scattering structure 140 (e.g., scattering elements 141 and 142) may be coupled to or isolated from a ground plane of antenna isolation system 100 (e.g., a ground plane of antenna elements 110 and/or 120).

In implementations with additional antenna elements, additional scattering structures may be formed or otherwise disposed between any adjacent antenna elements or groups of antenna elements (e.g., between adjacent implementations of antenna isolation system 100). In various implementations, the size, number, shape, and/or orientation of scattering elements of scattering structure 140 (e.g., scattering elements 141 and 142 in FIG. 1A), relative to antenna elements 110 and 120, for example, may be selected based on simulation and iterative refinement so as to maximize isolation with minimal negative performance effects on operation of antenna elements 110 and 120. In general, the size, and more particularly the length of elongate scattering elements (e.g., similar to scattering elements 141 and 142) should be as large or long as is allowed by other design concerns (e.g., overall antenna system or device size) with respect to antenna isolation system 100, though smaller and different sized scattering elements (and concomitant reduction in antenna isolation) are within the scope of this disclosure, so long as the scattering structure acts to reflect, redirect, and/or otherwise decouple power transmitted or received by one antenna element or group of elements from an adjacent antenna element or group of elements, as described herein.

Also shown in FIG. 1A are transmission lines 112 and 122, passive transmission structures 114 and 124, and antenna system interface 130, each of which may be formed from substrate 101. Transmission lines 112 and 122 may be configured to convey electrical signals between antenna system interface 130 and respective antenna elements 110 and 120 for transmission and/or reception of electromagnetic radiation or signals (e.g., wireless signals, which may include modulated, beamformed, and/or otherwise generated signals configured to convey data wirelessly between electronic devices). In various implementations, transmission lines 112 and 122 may include one or more passive transmission structures 114 and/or 124 configured to provide passive filtering (e.g., high pass, low pass, notch or bandpass filtering) and/or impedance matching between antenna system interface 130, transmission lines 112 and 122, and antenna elements 110 and 120. Each of transmission lines 112 and 122, passive transmission structures 114 and 124, and antenna system interface 130 may be formed from common layers of substrate 101, from different layers of substrate 101 (e.g., with one or more filled vias providing electrical coupling between elements), and/or from different substrates and/or circuit elements that are electrically coupled to substrate 101. In some implementations, antenna system interface 130 may be implemented with one or more analog, digital, active, and/or passive circuit elements (e.g., phase and/or amplitude adjusters) configured to provide signal characteristics (e.g., relative phase and/or amplitude) to signals transmitted to antenna elements 110 and/or 120 or detect signal characteristics (e.g., relative phase and/or amplitude) of signals received by antenna elements 110 and/or 120. In various implementations, antenna system interface 130 may be configured to convey signals between antenna isolation system 100 and external circuitry.

Figure 1B:
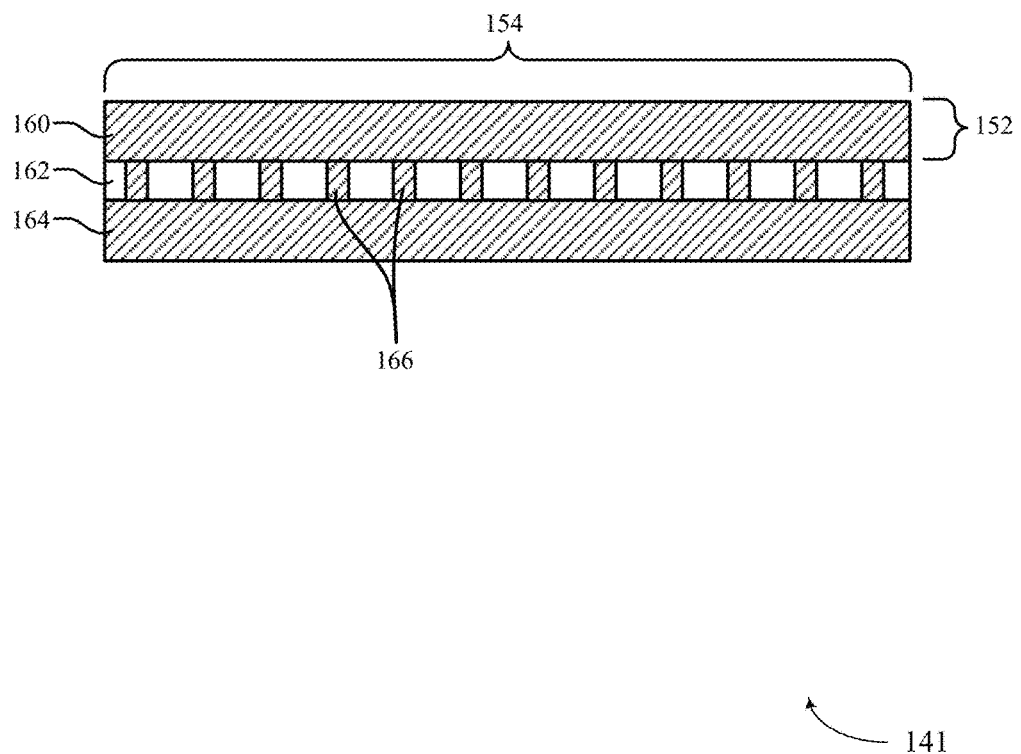
FIG. 1B is a schematic diagram illustrating an example of a scattering element for an antenna isolation system.

FIG. 1B is a schematic diagram illustrating an example of a scattering element 141 of scattering structure 140 in FIG. 1A for antenna isolation system 100. As shown in FIG. 1B, elongate scattering element 141 is implemented by rectangular patterned conductive metal layers 160 and 164, each having a patterned width 152 and a patterned length 154, above and below and/or adjoining dielectric layer 162 and electrically coupled to each other by multiple filled vias 166. Filled vias 166 may be circular, square, rectangular, or otherwise shaped holes in dielectric layer 162 filled with conductive material, such as solder or sputtered or otherwise formed conductive material, that electrically couples conductive metal layer 160 and 164 to each other. While the volume or number of filled vias 166 used to couple conductive metal layer 160 and 164 to each other should be as large as possible, the volume or number in any particular design may be limited by the minimum resolution of the process used to form filled vias 166, the related cost in time and other fabrication resources, and/or other design requirements.

In some implementations, patterned width 152 is selected to be approximately the minimum resolution of the process used to pattern scattering element 141 in substrate 101, a whole number multiple (e.g., 1×, 2×, etc.) of the largest skin depth corresponding to the expected operating frequency band for antenna isolation system 100, or the diameter or width of one of filled vias 166. More generally, patterned width 152 should be kept as small as possible and different from (e.g., smaller than) sizes corresponding to resonances with the expected operating frequency band for antenna isolation system 100. Patterned length 154 may be selected to be as long as is allowable by available space and compact-design limitations, for example, and different from (e.g., typically larger than) sizes corresponding to resonances with the expected operating frequency band for antenna isolation system 100, to substantially scatter (reflect and/or redirect) signals associated with operation of antenna elements 110 and/or 120. In some implementations, patterned length 154 may be selected to be longer than the longest dimension (e.g., overall width or length) of antenna elements 110 or 120, for example, and/or patterned width 152 may be smaller than the smallest dimension (e.g., overall width or length) of antenna elements 110 or 120.

More generally, scattering element 141 may be formed from one or multiple conductive metal layers separated by interstitial dielectric layers and electrically coupled to each other by filled vias. In implementations where scattering element 141 is formed from the same substrate from which antenna elements 110 and/or 120 are formed (e.g., as shown in FIG. 1A), any one of the conductive metal layers of scattering element 141 may be formed within the conductive metal layers used to form antenna elements 110 and/or 120 (e.g., one or more element layers or a ground plane of an antenna element). In one implementation, scattering element 141 may be formed from the same conductive metal layers used to form antenna elements 110 and/or 120. In any such implementations, scattering element 141 may be patterned so as to be electrically coupled to or isolated from a ground plane of antenna elements 110 and/or 120.

Figure 2A:
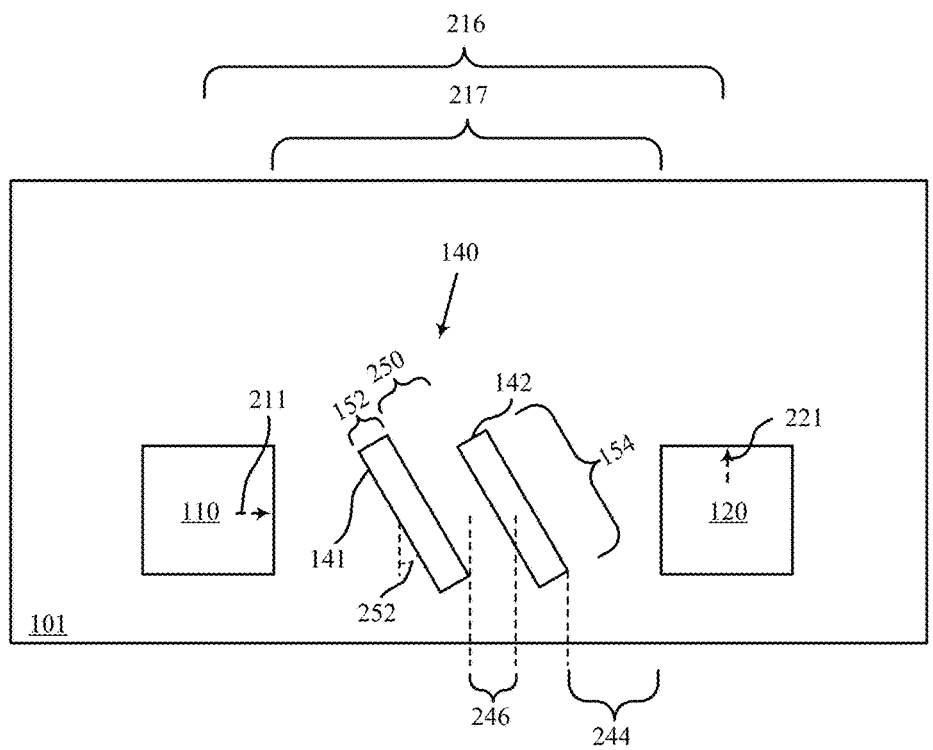
FIG. 2A is a block diagram illustrating an example of an antenna isolation system.
Figure 2B:
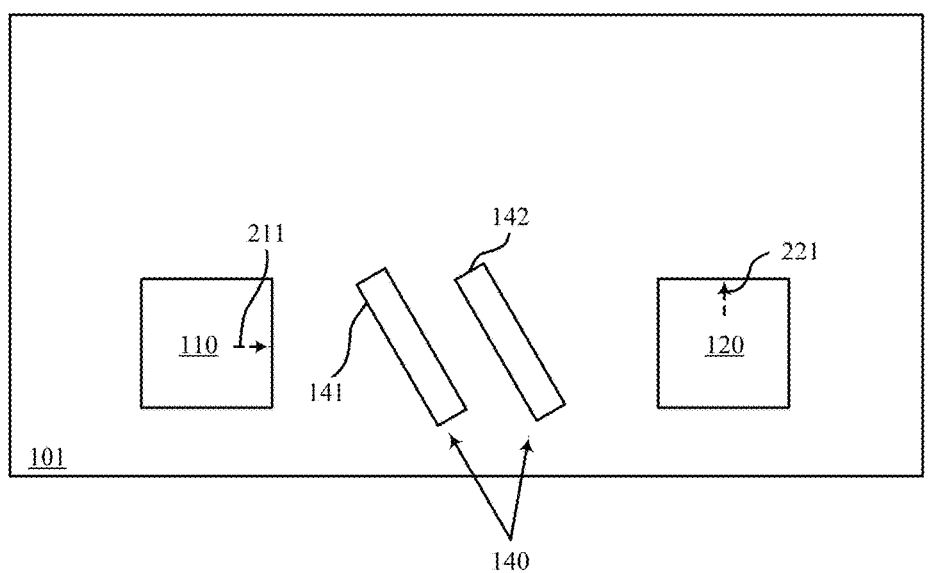
FIGS. 2B-C are block diagrams illustrating examples of differently arranged antenna isolation systems.
Figure 2C:
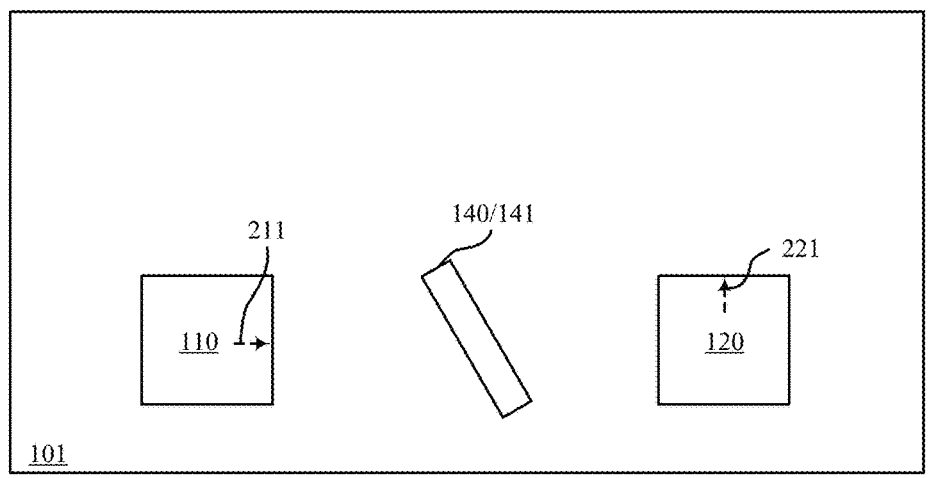

In general, the number, size, shape, orientation, location, and other arrangement characteristics of scattering elements for scattering structure 140 may be adjusted or selected to provide a desired or tuned isolation level between particular adjacent antenna elements or groups of elements, for example, or according to various antenna characteristics (e.g., polarization type or orientation, mode of operation, and/or other antenna characteristics) of such antenna elements or groups of antenna elements. Such selections or adjustments may be configured to increase or decrease how much scattering structure 140 reflects or redirects electromagnetic radiation away from antenna elements 110 and 120 to decouple and isolate antenna elements 110 and 120 from each other. FIGS. 2A-C illustrate different scattering structure characteristics and arrangements in accordance with implementations of the present disclosure.

FIG. 2A is a block diagram illustrating an example of an antenna isolation system 100 and various scattering structure characteristics. FIG. 2A shows structural alignments 211 and 221 (e.g., the approximate structural alignments for antenna elements 110 and 120, which may correspond to respective linear polarization alignments, if present), antenna element spacing 216 (e.g., the approximate center to center spacing between antenna elements 110 and 120), antenna element clearance 217 (e.g., the approximate clearance between antenna elements 110 and 120 available for placement of scattering structure 140/scattering elements 141 and 142), scattering structure clearance 244 (e.g., the approximate clearance between scattering structure 140 or a constituent scattering element, such as scattering element 142 in FIG. 2A, and an antenna element, such as antenna element 120 in FIG. 2A), scattering element offset 246 towards an antenna element (e.g., the approximate offset of the center of a scattering element, such scattering element 142 in FIG. 2A, relative to a center point between antenna elements 110 and 120, along a line connecting the centers of antenna elements 110 and 120, and towards a selected antenna element, such as antenna element 120 in FIG. 2A), scattering element clearance 250 (e.g., the approximate clearance between scattering elements 141 and 142), and alignment angle 252 (e.g., the approximate deviation of the long axis of scattering element 141 away from perpendicular to a center-to-center line between antenna elements 110 and 120, positive as shown in FIG. 2A). Such characteristics, along with width 152, length 154, and/or other shape parameters for scattering structure 140 and/or scattering elements 141 and 142, may be used to describe a variety of different implementations of the present disclosure.

For example, as can be seen in FIG. 1A, both scattering elements 141 and 142 may be formed in a parallel arrangement, and such that their scattering element clearance is approximately the same as their common widths 152, their alignment angles are approximately the same, and/or their respective scattering element offsets towards antenna element 120 are both positive (e.g., the combined scattering structure 140 has nonzero offset towards antenna element 120). By contrast, in FIG. 2A, scattering element 141 has a negative scattering element offset towards antenna element 120 and scattering element 142 has a positive scattering element offset towards antenna element 120 of the same magnitude, and so the combined scattering structure 140 in FIG. 2A has an effective zero offset towards antenna element 120.

FIGS. 2B-C are block diagrams illustrating examples of differently arranged antenna isolation systems 100B and 100C. In FIG. 2B, scattering structure 140 including scattering elements 141 and 142 may be formed in a mirror arrangement, such that the alignment angle for scattering element 141 is negative and the alignment angle for scattering element 142 is positive and of the same magnitude. In FIG. 2C, scattering structure 140 may be formed in a singular arrangement, such that scattering structure 140 includes only a single scattering element (e.g., scattering element 141). Structural alignments 211 and/or 221 shown in FIGS. 2A-C may be different from the alignments shown in FIGS. 2A-C, for example, or may be absent, and may or may not influence the selection of a particular scattering structure arrangement and/or set of scattering structure characteristics, as described herein.

More generally, scattering structures formed according to implementations disclosed herein may include any number of scattering elements, each of which may have their own alignment angle, width, length, size, shape, and/or other scattering structure or element characteristic, as described herein. Specific implementations include: scattering structures with a whole number of scattering elements in the range of 1-10, and in particular, 1, 2, and 4 scattering elements; scattering structures with non-zero alignment angle magnitudes, such as between 20 and 70 degrees and, more particularly, of approximately 45 degrees; scattering structures with singular, parallel, or mirror arrangements, or combination arrangements including combinations of singular, parallel, or mirror arrangements; and/or scattering structures with substantially rectangular or ellipse shaped or elongate scattering elements. Such scattering structures can be configured to provide approximately 30 to 45 dB of isolation between adjacent antenna elements and/or groups of antenna elements at frequencies in the range of approximately 55-70 GHz, and more particularly, for example, in the range of approximately 57-69 GHz.

Figure 3:
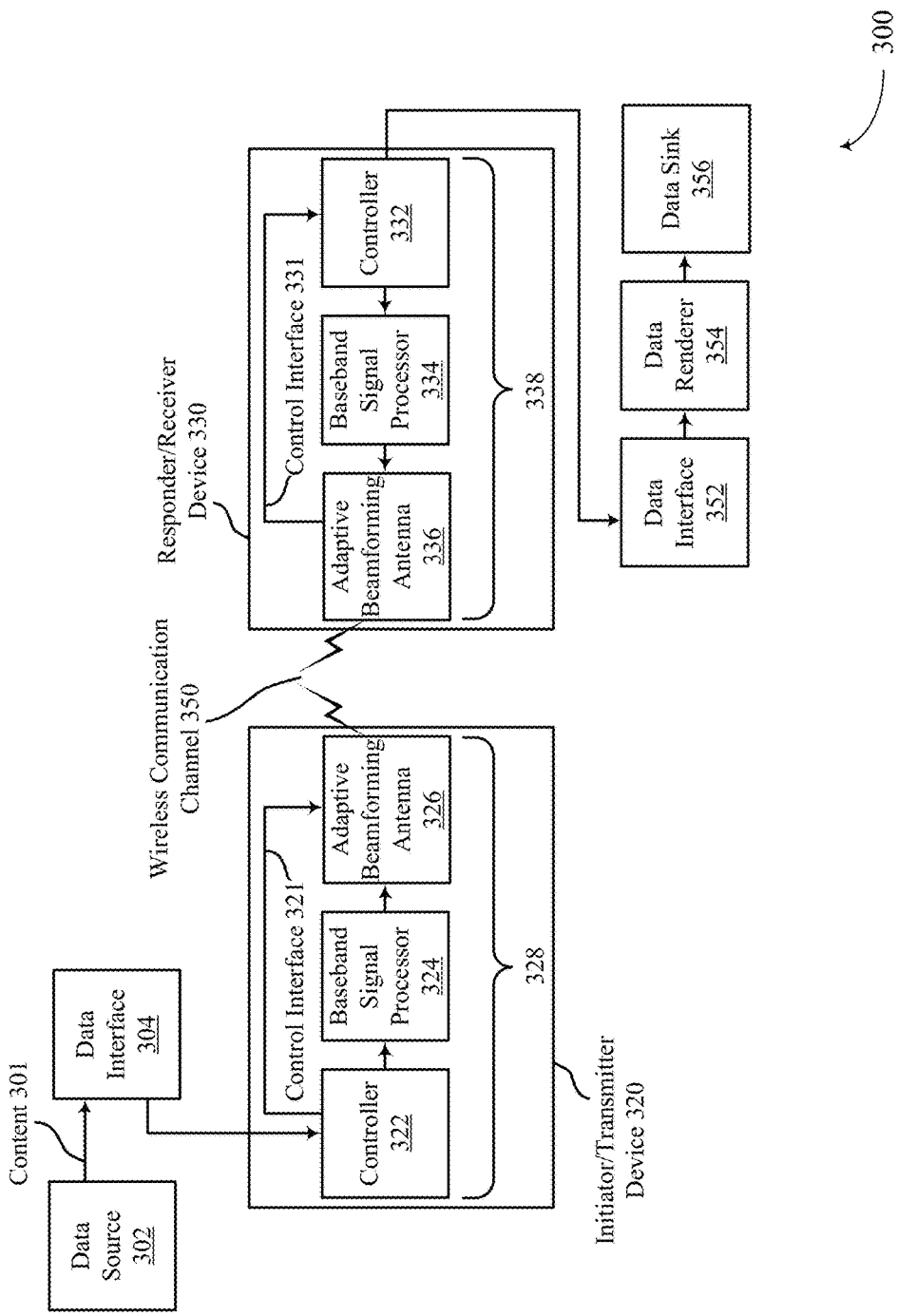
FIG. 3 is a block diagram illustrating an example of a wireless communication system incorporating an antenna isolation system.

FIG. 3 is a block diagram illustrating an example of a wireless communication system 300 incorporating an antenna isolation system. Wireless communication system 300 may include a data source 302, a data interface 304, an initiator/transmitter device 320, a responder/receiver device 330, a data interface 352, a data renderer 354, and a data sink 356. Data source 302 may store data and provide data to initiator/transmitter device 320 for transmission to responder/receiver device 330. Data source 302 may be a computing device providing data for transmission to another computing device (e.g., data sink 356). In some implementations, data source 302 may be a routing device to connect to a wide area network. In various implementations, data source 302 may be a laptop, a smartphone, a tablet computer, a desktop computer, a notebook computer, and/or other user device, and in some implementations may incorporate data interface 304 and initiator/transmitter device 320. Data interface 304 may obtain data from data source 302 and provide it to initiator/transmitter device 320.

Initiator/transmitter device 320 and responder/receiver device 330 (e.g., wireless communication devices) may be implemented with similar hardware components and may wirelessly communicate with each other and with other participating and non-participating devices, as described herein. Initiator/transmitter device 320 and responder/receiver device 330 may be implemented as half-duplex or full duplex wireless communication devices. Initiator/transmitter device 320 may include a controller 322, a baseband signal processor 324, an adaptive beamforming antenna 326, and a wireless communication channel interface (e.g., also referred to as an antenna sub-system) 328, which may include all or portions of controller 322, baseband signal processor 324, and/or adaptive beamforming antenna 326, as shown. Initiator/transmitter device 320 may include a controller 332, a baseband signal processor 334, an adaptive beamforming antenna 336, and a wireless communication channel interface 338, which may include all or portions of controller 332, baseband signal processor 334, and/or adaptive beamforming antenna 336, as shown. The controllers (322 or 332) may be configured to perform various beamforming operations, including operations facilitating determining a combined beam or other beam antenna wave vector (AWV) according to one or more of the methodologies described in International Patent Application No.: PCT/US2016/041405 filed on Jul. 2, 2016, and entitled "SYSTEMS AND METHODS OF INTERFERENCE MITIGATION FOR CONCURRENT LINKS IN BEAMFORMED COMMUNICATION," International Patent Application No. PCT/US2016/043765 filed on Jul. 22, 2016 and entitled "ANGLE AND POSITION SENSING USING ARRAYS OF ANTENNAS," and/or U.S. patent application Ser. No. 15/419,929 filed on Jan. 30, 2017 and entitled "BEAMFORMING BASED ON ADJACENT BEAMS SYSTEMS AND METHODS," which are all hereby incorporated by reference in their entirety.

The baseband signal processor (324 or 334) may be configured to manage radio functions (e.g., Wi-Fi and Bluetooth radio functions, as well other functions or wireless communication protocols that utilize an antenna or antenna array) of an associated antenna sub-system. In various implementations, an antenna sub-system of initiator/transmitter device 320 or responder/receiver device 330 (e.g., wireless communication channel interface 328 or 338) typically includes at least an adaptive beamforming antenna (e.g., adaptive beamforming antenna 326 or 336) and may be configured to transmit and/or receive beamformed wireless transmissions, as described herein. In various implementations, wireless communication channel interface 328 and/or 338 may include one or more adaptive beamforming antennas to transmit beamformed wireless transmissions, and one or more adaptive beamforming antennas to receive beamformed wireless transmissions. In additional implementations, one or more antenna elements of adaptive beamforming antenna 326/336 may be configured to transmit or receive non-beamformed signals (e.g., such as a single antenna element configured for substantially omnidirectional transmission/reception). In further implementations, wireless communication channel interface 328 and/or 338 may include a separate omnidirectional antenna.

Wireless communication channel interfaces 328 and 338 may be configured to allow their respective devices to communicate with each other over wireless communication channel 350, which may be a Wi-Fi network or other standard or proprietary wireless communications network, for example, and be characterized by a combined or other type of beam AWV and implemented by a corresponding combined or other type of beam, as described herein. For example, controller 322 may be configured to select a set of test beam AWVs configured to detect and/or localize responder/receiver device 330, receive a corresponding set of channel measurement responses from responder/receiver device 330, determine a combined or other type of beam AWV, and configure the antenna sub-system to form wireless communication channel 350 according to the determined combined or other type of beam AWV between initiator/transmitter device 320 and responder/receiver device 330.

Controllers 322/332, baseband signal processors 324/334, and adaptive beamforming antennas 326/336 may each be implemented as or with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of initiator/transmitter device 320 and/or responder/receiver device 330, for example. Such software instructions may also implement methods for transmitting and receiving packets, beamforming communication channels, determining channel measurement information, querying devices for operational parameters, selecting operational parameters for devices, and/or performing any of the various methods described herein.

The adaptive beamforming antenna (326 or 336) may be configured to perform adaptive spatial signal processing with an array of transmitters or receivers and corresponding antennas/antenna elements. The signals may be combined in a manner to increase signal strength to/from a chosen direction and/or to form wireless communication channel/communication link 350 (e.g., constructive signals). Signals to/from other directions may be combined in a destructive manner, resulting in degradation/reduction in signal strength of the signals to/from the undesired directions (e.g., destructive interference). In various implementations, adaptive beamforming antennas 326 or 336 may be implemented according to and/or incorporating features of antenna isolation systems 100, 100B, and/or 100C of FIGS. 1A-2C, such as one or more scattering structures 140 disposed between adjacent antenna elements of adaptive beamforming antennas 326 or 336.

The control interface (321 or 331) enables a controller to manage an adaptive beamforming antenna, including changing antenna direction, adjusting signal strength towards particular direction, and/or other beamforming functions. Controller 332 of responder/receiver device 330 may be communicatively connected with data interface 352, which allows responder/receiver device 330 to interact with (e.g., storing, modifying, and/or communicating data) data sink 356 through data renderer 354, which may be configured to format data appropriately for data sink 356. In some implementations, controller 322, baseband signal processor 324, and adaptive beamforming antenna 326 (or controller 332, baseband signal processor 334, and adaptive beamforming antenna 336) are collectively referred to as a wireless communication channel interface, as shown. By employing implementations and/or features of antenna isolation systems 100, 100B, and/or 100C, as described herein, initiator/transmitter device 320 and responder/receiver device 330 are able to communicate more information more reliably over longer distances than such devices implemented without sufficient isolation between adjacent antenna elements and, correspondingly, with generally worse sensitivities, worse signal-to-noise ratios, and lower overall performance.

Figure 4:
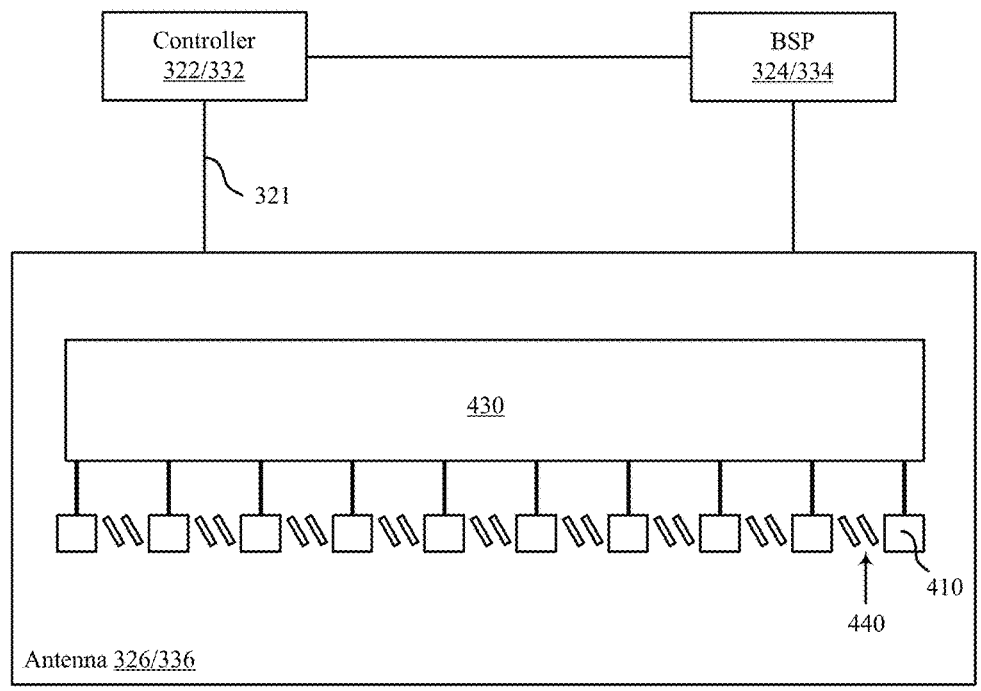
FIG. 4 is a block diagram illustrating an example of a wireless communication channel interface for a wireless communication system incorporating an antenna isolation system.

For example, FIG. 4 is a block diagram illustrating an example of a wireless communication channel interface 328/338 for wireless communication system 300 including features of an antenna isolation system. As shown in FIG. 4, wireless communication channel interface 328/338 includes controller 322/332 and baseband signal processor 324/334 controlling operation of antenna 326/336. Antenna 326/336, which may be implemented as an adaptive beamforming antenna, includes various features of antenna isolation system 100, such as antenna system interface 430 (e.g., corresponding to antenna system interface 130 in FIG. 1A), multiple antenna elements 410, and multiple scattering structures 440 disposed between adjacent ones of antenna elements 410. In the implementation shown in FIG. 4, antenna elements 410 are arranged in a linear array, and scattering structures 440 are each arranged in a parallel arrangement. In other implementations, antenna elements 410 may be arranged in a differently shaped array, such as a two dimensional array or a three dimensional array, for example, and/or scattering structures 440 may each be arranged in different arrangements, such as singular, parallel, or mirror arrangements, or combinations of these. In implementations where antenna elements 410 are arranged in a two dimensional array, each scattering structure 440 may be formed to be substantially spatially coplanar with nearest neighbor antenna elements and/or next nearest neighbor antenna elements, for example. Similar positioning of scattering structures 440 may be used with three dimensional antenna arrays formed on or positioned according to a three dimensional surface, such as an ellipsoid, the surface of a parallelepiped, and/or portions thereof.

Figure 5:
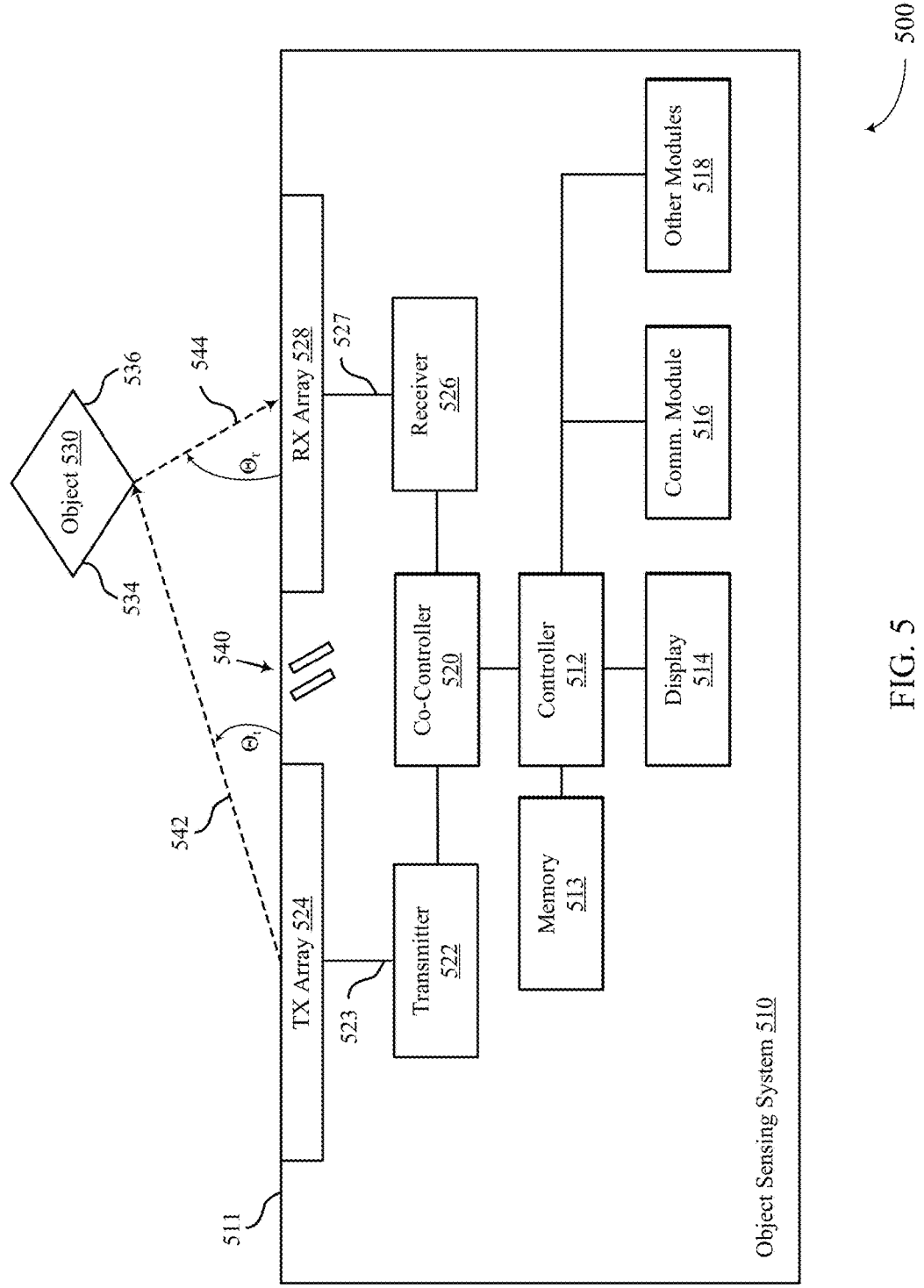
FIG. 5 illustrates a block diagram of an example of an object sensing system incorporating one or more antenna isolation systems.

FIG. 5 illustrates a block diagram 500 of an example of an object sensing system 510 incorporating one or more antenna isolation systems. In various implementations, system 510 may be implemented as compact, portable, and/or wearable device configured to detect a position (e.g., angle and/or range) of an object 530 relative to system 510. More generally, system 510 may be implemented as any device or system including a transmitter antenna array 524 and a receiver antenna array 528 configured to detect the position of object 530 using the methods described herein. In various implementations, system 510 may include one or more features of antenna isolation systems 100, 100B, 100C, and 300 of FIGS. 1A-3, and antenna 326/336 of FIG. 4, as described herein. For example, transmitter array 524 and receiver array 528 may be implemented similarly to antenna 326/336 in FIG. 4 and include one or more scattering structures 440 disposed between antenna elements of transmitter antenna array 524 and/or receiver antenna array 528, and object sensing system 510 may include scattering structure 540 disposed between and/or substantially coplanar with transmitter antenna array 524 and receiver antenna array 528.

As shown in the implementation illustrated in FIG. 5, system 510 includes controller 512 and co-controller 520. Controller 512 and/or co-controller 520 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of co-controller 520, transmitter 522, receiver 526, and/or other modules of system 510, for example. Such software instructions may also implement methods for processing sensor signals, determining sensor information, providing user feedback (e.g., through display 514), querying devices for operational parameters, selecting operational parameters for devices, or performing any of the various methods described herein.

For example, controller 512 and/or co-controller 520 may be configured to designate a plurality of transmitter and receiver channels for transmitter antenna array 524 and receiver antenna array 528 of object sensing system 510, scan transmitter antenna array 524 and receiver antenna array 528 through the designated channels to measure channel responses corresponding to each one of the designated channels, and determine directional vectors 542 and/or 544 to/from a nearest point 532 of object 530 based, at least in part, on the measured channel responses. In some implementations controller 512 and/or co-controller 520 may be configured to determine multiple directional vectors corresponding to surfaces 534 and/or 536 of object 530, for example, in addition to or as an alternative to determining directional vectors 542 and/or 544 to/from nearest point 532 of object 530.

In some implementations, directional vectors 542 and/or 544 may be defined by their corresponding angle of departure (AoD) θt or angle of arrival (AoA) Or, as shown in FIG. 5. AoD may be defined variously as the angle between emission surface 511 and directional vector 542 to object 530, as the complement of the angle between the array normal vector (e.g., the normal to surface 511) and directional vector 542 between an antenna element of transmitter antenna array 524 and object 530, or as the angle between the broadside direction of transmitter antenna array 524 and object 530. AoA may be defined variously as the angle between emission surface 511 and directional vector 544 from object 530, as the complement of the angle between the array normal vector and directional vector 544 between object 530 and an antenna element of receiver antenna array 528, or as the angle between the broadside direction of receiver antenna array 528 and object 530. Once directional vectors 542 and/or 544 or AoD θt and/or AoA Or are determined, controller 512 may be configured to use display 514 to indicate detection of object 530 or a relative position of object 530, for example, or to provide a radar image of object 530. In other implementations, controller 512 may be configured to use the determined directional vectors 542 and/or 544 or AoD θt and/or AoA θr to implement different methods for determining updated positions for object 530, for example, or for determining an angular speed of object 530, as described herein.

In various implementations, a machine readable medium, such as memory 513, may be provided for storing non-transitory instructions for loading into and execution by controller 512 or co-controller 520. In these and other implementations, controller 512 and/or co-controller 520 may be implemented with other components where appropriate, such as volatile memory, non-volatile memory, one or more interfaces, and/or various analog and/or digital components for interfacing with various modules of system 510. For example, controller 512 may be adapted to store sensor signals, sensor information, parameters for coordinate frame transformations, calibration parameters, sets of calibration points, and/or other operational parameters, over time, for example, and provide such stored data to a user using display 514.

In typical implementations, controller 512 may be tasked with overseeing general operation of system 510, generating imagery from radar data, correlating radar data/imagery, communicating operational parameters and/or sensor information with other devices through communication module 516, and/or other non-time-critical operations of system 510. In such implementations, co-controller 520 may be implemented with relatively high resolution timing circuitry capable of generating digital transmission and/or sampling control signals (e.g., amplitude weight vectors) for operating transmitter 522, receiver 526, and/or other devices of system 510, for example, and other time critical operations of system 510, as described herein. In some implementations, controller 512 and co-controller 520 may be integrated together, for example, or may be implemented in a distributed manner across a number of individual controllers.

Transmitter 522 may be implemented with one or more digital to analog converters (DACs), signal shaping circuits, filters, phase adjusters, signal conditioning elements, amplifiers, attenuators, timing circuitry, logic devices, and/or other digital and/or analog electronics configured to accept digital control signals from co-controller 520 and to provide analog transmission signals over analog interface 523 to excite one or more antenna elements of transmitter antenna array 524 and produce one or more transmission beams or channels, as described herein. In various implementations, overall operation of transmitter 522 (e.g., amplification, attenuation, phase shifting, AWV application, and/or other per-element signal adjustments) may be controlled (e.g., through use of the various control signals) by co-controller 520.

Receiver 526 may be implemented with one or more analog to digital converters (ADCs), filters, phase adjusters, signal conditioning elements, amplifiers, attenuators, timing circuitry, logic devices, and/or other digital and/or analog electronics configured to receive analog signals over analog interface 527 corresponding to one or more antenna elements of receiver antenna array 528, convert the analog signals into digital signals, and provide the digital signals to co-controller 520 for processing and/or storage, as described herein. In various implementations, operation of receiver 526 (e.g., amplification, attenuation, basebanding, sampling, timing/triggering, AWV application, and/or other per-element signal adjustments) may be controlled by co-controller 520. In some implementations, receiver 526 may be configured to low-pass or otherwise filter, amplify, decimate, and/or otherwise process the analog and/or digital signals (e.g., using analog and/or digital signal processing) prior to providing the digital signals to co-controller 520. In other implementations, receiver 526 may be configured to provide substantially unprocessed (e.g., raw) analog and/or digital signals to co-controller 520 for further signal processing, as described herein. In some implementations, transmitter 522 and receiver 526 may be integrated into a single transceiver.

Display 514 may be implemented as a digital display, a touch screen, and/or other display device that can be configured to display radar data, images, text, icons, indicators, and/or other graphics as controlled by co-controller 520. Communication module 516 may be implemented as one or more analog or digital devices or interfaces configured to support wired or wireless communications to other devices, including other object sensing systems similar to object sensing system 510. In such implementations, system 510 may be configured to broadcast detection characteristics and/or data corresponding to object 530, for example, or to collaboratively detect a position or motion of object 530. In one implementation, communication module 516 may be configured to co-opt any combination of co-controller 520, transmitter 522, transmitter antenna array 524, receiver 526, and/or receiver antenna array 528 to communicate wirelessly with other devices and/or systems.

Other modules 518 may include one or more additional interfaces, feedback devices, support electronics, and/or environmental sensors, such as a physical user interface device (e.g., a joystick, rotating selector, button), indicator, battery or power supply/charging circuit, strap or lanyard, wired or wireless communications interface, external memory slot or interface, speaker, microphone, fingerprint sensor, pulse monitor, digital light/image projector (e.g., configured to overlap with an available detection area of transmitter antenna array 524 and receiver antenna array 528), accelerometer/gyroscope, global navigation satellite system (GNSS) receiver, and/or other electronic modules or devices commonly found in a portable electronic device or smart phone/watch.

Transmitter antenna array 524 and receiver antenna array 528 may each be implemented as any linear antenna array arrangement or any two or multidimensional antenna array arrangement that can be energized by transmitter 522 and receiver 526, respectively, to form various different channels between transmitter antenna array 524 and receiver antenna array 528, as described herein and with respect to FIGS. 2A-E of International Patent Application No. PCT/US2016/043765 filed on Jul. 22, 2016 and entitled "ANGLE AND POSITION SENSING USING ARRAYS OF ANTENNAS," which is hereby incorporated by reference in its entirety. More specifically, transmitter antenna array 524 may be configured to receive transmission signals over analog interface 523 (e.g., traces and/or waveguides) and generate a corresponding transmitter beam or channel using one or a combination of antenna elements of transmitter antenna array 524. Similarly, receiver antenna array 528 may be configured to receive transmission signals over analog interface 527 (e.g., traces and/or waveguides) and generate a corresponding receiver beam or channel using one or a combination of antenna elements of receiver antenna array 528.

In various implementations, transmitter antenna array 524 and receiver antenna array 528 may be implemented as printed or microstrip antenna arrays arranged on a relatively flat substrate and be configured to operate most efficiently in the GHz bands, and more specifically between 50 GHz and 70 GHz, or approximately within the 60 GHz band. Each array may include one or multiple antenna elements, and each group of antenna elements may be formed according to a variety of patterns, such as rectangular, square, centered square, E-shaped, inverted F, and/or other patterns, which may be selected to facilitate a particular radiation pattern, available detection area, and/or other operational feature of the individual antenna arrays and/or object sensing system 510. In some implementations, the antenna elements in each array may be spaced uniformly relative to their nearest adjacent antenna elements, for example, and the separation can be dictated by the expected operating frequency. For example, for 60 GHz millimeter-wave applications, an antenna separation d may be approximately 2.5 mm.

Additionally, each pair of nearest adjacent antenna elements and/or each pair of next nearest adjacent antenna elements (for two and three dimensional antenna arrays) may include a scattering structure disposed between the pair of adjacent antenna elements and configured to reduce electromagnetic coupling between the pair of antenna elements by directing electromagnetic radiation coupled through each antenna element away from the adjacent antenna element, as described herein.

Figure 6:
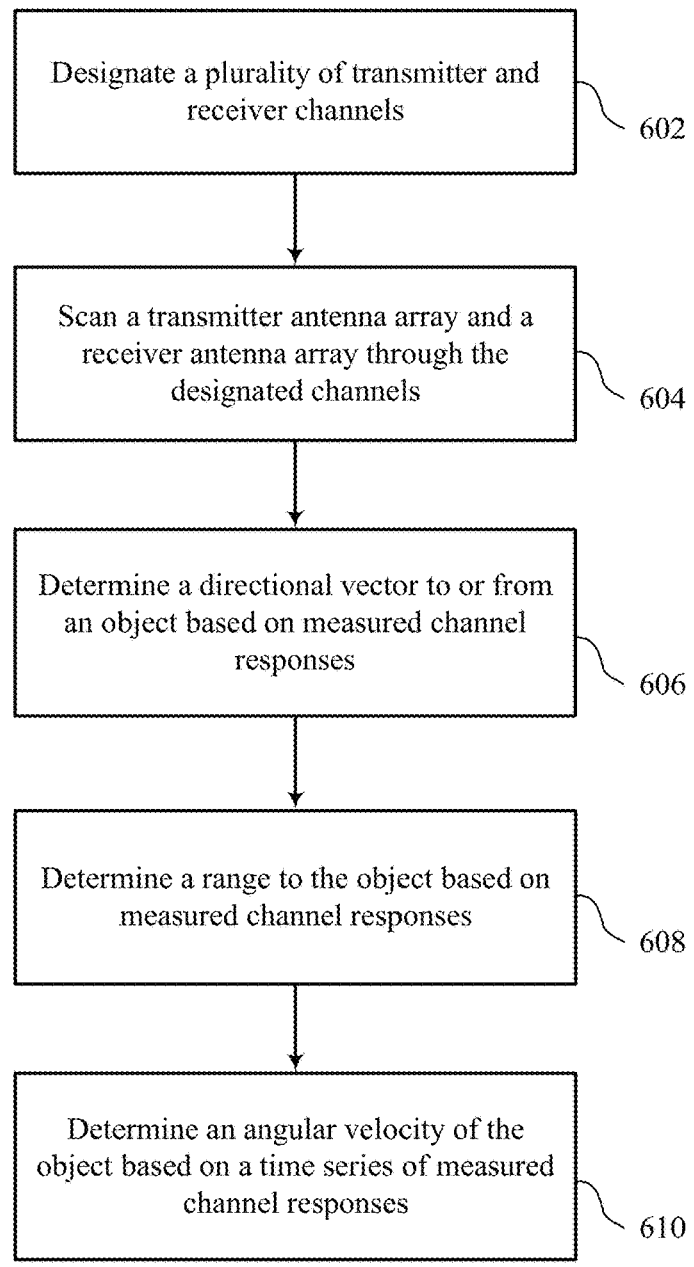
FIG. 6 illustrates an example of a process to detect the relative position (e.g., angle and/or range) of an object using an object sensing system incorporating an antenna isolation system.

FIG. 6 illustrates an example of a process 600 to detect the relative position (e.g., angle and/or range) of object 530 using object sensing system 510 incorporating one or more features of an antenna isolation system. In some implementations, the operations of FIG. 6 may be implemented as software instructions executed by one or more logic devices associated with corresponding electronic devices, sensors, and/or structures depicted in FIGS. 1A through 5. More generally, the operations of FIG. 6 may be implemented with any combination of software instructions and/or electronic hardware (e.g., inductors, capacitors, amplifiers, actuators, or other analog and/or digital components). It should be appreciated that any step, sub-step, sub-process, or block of processes 600 may be performed in an order or arrangement different from the implementations illustrated by FIG. 6. For example, in other implementations, one or more blocks may be omitted from process 600, and other blocks may be included. Furthermore, block inputs, block outputs, various sensor signals, sensor information, calibration parameters, and/or other operational parameters may be stored to one or more memories prior to moving to a following portion of process 600. Although process 600 is described with reference to system 510 and FIGS. 1A-5, process 600 may be performed by other systems different from system 510 and including a different selection of electronic devices, sensors, assemblies, and/or antenna arrangements. More generally, process 600 may be implemented according to any of the systems and methods described in International Patent Application No. PCT/US2016/043765 filed on Jul. 22, 2016 and entitled "ANGLE AND POSITION SENSING USING ARRAYS OF ANTENNAS," which is hereby incorporated by reference in its entirety. At the initiation of process 600, various system parameters may be populated by prior execution of a process similar to process 600, for example, or may be initialized to zero and/or one or more values corresponding to typical, stored, and/or learned values derived from past operation of process 600, as described herein.

At block 602, a logic device designates a plurality of transmitter and receiver channels. For example, controller 512 and/or co-controller 520 of object sensing system 510 may be configured to designate a plurality of transmitter and receiver channels for transmitter antenna array 524 and receiver antenna array 528 of object sensing system 510, which may include one or more scattering structures disposed between adjacent antenna elements, for example, and/or scattering structure 540 disposed between transmitter antenna array 524 and receiver antenna array 528 of object sensing system 510. In some implementations, controller 512 may be configured to designate the plurality of transmitter and receiver channels by forming a transmitter AWV matrix (e.g., $M_{TX}$ or $X_{TX}$) comprising one or more transmitter AWVs corresponding to each transmitter channel in a desired plurality of transmitter and receiver channels, and by forming a receiver AWV matrix (e.g., $M_{RX}$ or $Y_{RX}$) comprising one or more receiver AWVs corresponding to each receiver channel in the desired plurality of transmitter and receiver channels. In such implementations, the transmitter AWV matrix and the receiver AWV matrix may each comprise a Hadamard matrix (e.g., $M_{TX}$ or $M_{RX}$), as described herein.

Alternatively, the transmitter AWV matrix and the receiver AWV matrix may each comprise AWVs configured to focus the designated channels within a particular subset of an available detection area (e.g., $X_{TX}$ or $Y_{RX}$), such as after initially detecting an object and desiring to track the object more efficiently or with higher angular resolution. In other implementations, the designated channels may be selected to correspond to different transmitter or receiver beam angles relative to emission surface 511 of the transmitter antenna array and/or the receiver antenna array, which can also be used as a simplified method to scan a designated area for object 530. In still further implementations, the designated channels may correspond to pairs of individual antenna elements comprising one antenna element from each of transmitter antenna array 524 and receiver antenna array 528.

At block 604, a logic device scans a transmitter antenna array and a receiver antenna array through designated channels. For example, controller 512 and/or co-controller 520 may be configured to scan transmitter antenna array 524 and receiver antenna array 528 through the channels designated at block 602 to measure channel responses corresponding to each one of the designated channels. In some implementations, controller 512 may be configured to form a measurement matrix (e.g., A) comprising entries corresponding to each measured channel response. In such implementations, controller 512 may be configured to derive a channel matrix (e.g., H) from the measurement matrix and the transmitter and receiver AWV matrices designated at block 602. In alternative implementations where the designated channels correspond to pairs of individual antenna elements comprising one antenna element from each of the transmitter antenna array and the receiver antenna array, controller 512 may be configured to form a channel matrix comprising entries corresponding to each measured channel response.

At block 606, a logic device determines a directional vector to or from an object based on measured channel responses. For example, controller 512 and/or co-controller 520 may be configured to determine directional vector 542 and/or 544 to or from object 530 based, at least in part, on the channel responses measured at block 604. In some implementations, controller 512 may be configured to determine directional vector 542 and/or 544 to or from object 530 by performing singular value decomposition on the channel matrix provided at block 604 to determine at least a largest singular value corresponding to directional vector 542 or 544 to or from nearest point 532 of object 530. In other implementations, controller 512 may be configured to determine directional vector 542 and/or 544 to or from object 530 by performing singular value decomposition on the measurement matrix to determine at least a largest singular value and a corresponding measurement matrix singular vector, and by applying a transformation matrix based on the transmitter or receiver AWV matrix provided at block 604 to the measurement matrix singular vector to transform the measurement matrix singular vector into directional vector 542 or 544 to or from object 530.

In further implementations, where the channel matrix is formed by scanning pairs of individual antenna elements, controller 512 may be configured to determine directional vector 542 and/or 544 to or from object 530 by performing singular value decomposition on the channel matrix to determine at least a largest singular value corresponding to directional vector 542 and/or 544 to or from object 530. In yet further implementations where the designated channels correspond to different transmitter or receiver beam angles, controller 512 may be configured to determine directional vector 542 or 544 to or from the object, in the form of an AoD or an AoA, by identifying one of the measured channel responses provided at block 604 comprising a peak signal level and setting the AoD or the AoA to the transmitter or receiver beam angle corresponding to the one measured channel response comprising the peak signal level.

In alternative implementations, controller 512 may be configured to determine a plurality of phase differences between signals in the measured channel responses provided at block 604, corresponding to pairs of adjacent antenna elements within either transmitter antenna array 524 or receiver antenna array 528, and then to determine the directional vector 542 or 544 to or from object 530, in the form of an AoD or an AoA, by averaging the plurality of determined phase differences and converting the resulting average phase difference into the AoD or AoA. In implementations where transmitter antenna array 524 and/or receiver antenna array 528 comprises a two dimensional antenna array having first and second major axes, controller 512 may be configured to determine a first plurality of phase differences between signals in the measured channel responses corresponding to adjacent antenna elements along the first major axis within either transmitter antenna array 524 or receiver antenna array 528, to determine a second plurality of phase differences between signals in the measured channel responses corresponding to adjacent antenna elements along the second major axis within either transmitter antenna array 524 or receiver antenna array 528, and then to determine directional vector 542 or 544 to or from object 530, in the form of an angle of departure (AoD) or an angle of arrival (AoA), by averaging the first plurality of determined phase differences, separately averaging the second plurality of determined phase differences, and converting the resulting first and second average phase differences into the AoD or AoA.

In further implementations, controller 512 may be configured to determine a plurality of phase differences between signals in the measured channel responses provided at block 604, corresponding to pairs of "integer adjacent" antenna elements within either transmitter antenna array 524 or receiver antenna array 528 (e.g., spatially adjacent elements, and elements an integer number of antenna array spacing d away from each other, both circumstances hereby generally defined as "integer adjacent"), and then to determine the directional vector 542 or 544 to or from object 530, in the form of an AoD or an AoA, by averaging the plurality of determined phase differences, each normalized by the corresponding integer of their integer spacing, and converting the resulting average phase difference into the AoD or AoA.

In still further implementations, where the channel matrix is formed by scanning pairs of individual antenna elements, controller 512 may be configured to determine directional vector 542 and/or 544 to or from object 530 by comparing tabulated calibration values to corresponding measured channel responses in the channel matrix. For example, system 510 may be configured to perform a calibration process (e.g., shortly after manufacture) including measuring the channel responses of various calibration objects as each is presented to system 510/surface 511 over a particular range of AoDs and AoAs. Each calibration object may include a variety of characteristics, such as shape, size, dielectric property, and/or other object characteristics, for example, and may be presented to system 510/surface 511 according to different calibration procedures, such as at different ranges from surface 511, according to different ranges or resolutions of AoDs and AoAs, at different relative orientations, and/or other calibration procedures configured to calibrate system 510 according to expected object characteristics and detection circumstances. The resulting calibrated channel responses may be tabulated according to one or more calibration object characteristics and/or detection circumstances, and the known AoDs and/or AoAs (e.g., directional vectors to or from the calibration object), to form the tabulated calibration data or values.

In some implementations, the tabulated channel responses may be normalized according to their individual magnitudes to render the corresponding calibrated reference values substantially invariant with respect to a range or distance to a detected object. Additionally, channel responses corresponding to adjacent or integer adjacent transmitter or receiver pairs may be combined (e.g., conjugate multiplied, or otherwise combined) such that the phase of the combined signal (e.g., the product, if conjugate multiplied) is related/proportional to the phase difference related to the AoD or AoA. Once the tabulated calibration data is determined (e.g., channel responses, normalized channel responses, normalized and combined channel responses, as described herein), the tabulated calibration data may be used to determine the AoD and AoA and/or series of AoDs and AoAs of an object.

For example, controller 512 may be configured to normalize and/or combine individual measured channel responses in the channel matrix provided at block 604 and compare the processed channel matrix values/entries to corresponding calibrated reference values in the tabulated calibration data derived as described herein. Controller 512 may be configured to determine the calibrated reference values numerically closest (e.g., minimum absolute value difference if a number, least squares fit if multiple numbers or a signal response, and/or other comparison techniques) to the processed channel matrix entries and selecting the corresponding tabulated AoA and/or AoD as the AoA and/or AoD of object 530.

At block 608, a logic device determines a range to an object based on measured channel responses. For example, controller 512 and/or co-controller 520 may be configured to determine a range to object 530 based on at least one of the measured channel responses determined at block 604 that is provided as a sampled impulse response. In some implementations, controller 512 may be configured to perform a modified matching pursuit process that uses the sampled impulse response to determine a range from transmitter antenna array 524 and/or receiver antenna array 528 to object 530.

At block 610, a logic device determines an angular velocity of an object based on a time series of measured channel responses. For example, controller 512 and/or co-controller 520 may be configured to determine an angular velocity of object 530 based on a time series of measured channel responses provided through repeated iteration of block 604 over a period of time. In some implementations, controller 512 may be configured to repeatedly scan transmitter antenna array 524 and receiver antenna array 528 through the channels designated at block 602 over a period of time to generate a time series of the measured channel responses provided at block 604, to determine a time series of average phase differences based on the time series of measured channel responses, and to determine an average angular velocity of object 530 from the time series of average phase differences by applying a Fourier transform to a form of the time series of average phase differences and identifying a peak in the resulting transformation as the average angular velocity.

By employing the methods described herein, including combinations of different or alternative methods, implementations of the present disclosure are able to efficiently and reliably detect and/or differentiate between one or multiple objects within an available detection area that can be scanned by channels formed between a transmitter antenna array and a receiver antenna array. Moreover, implementations are able to determine a relative position (angle and/or range) to the detected objects and/or a relative angular velocity of the detected objects with changes in angular position detectable to resolutions of approximately 0.1 degrees, 0.02 degrees, or less, depending on object size, shape, and range, and changes in range detectable to resolutions of approximately 1 mm or less from an average range of approximately 1 or 2 cm to approximately 3 m from surface 511. Devices using such systems and methods present a new and robust avenue for user interfaces relying on spatial detection of human fingers, stylus, and/or other user interface mechanisms. Moreover, devices including antenna isolation systems, as described herein, may be made more compact and/or be able to operate more reliably at higher power levels and detect objects and object positions and/or other characteristics at longer ranges.

Figure 7:
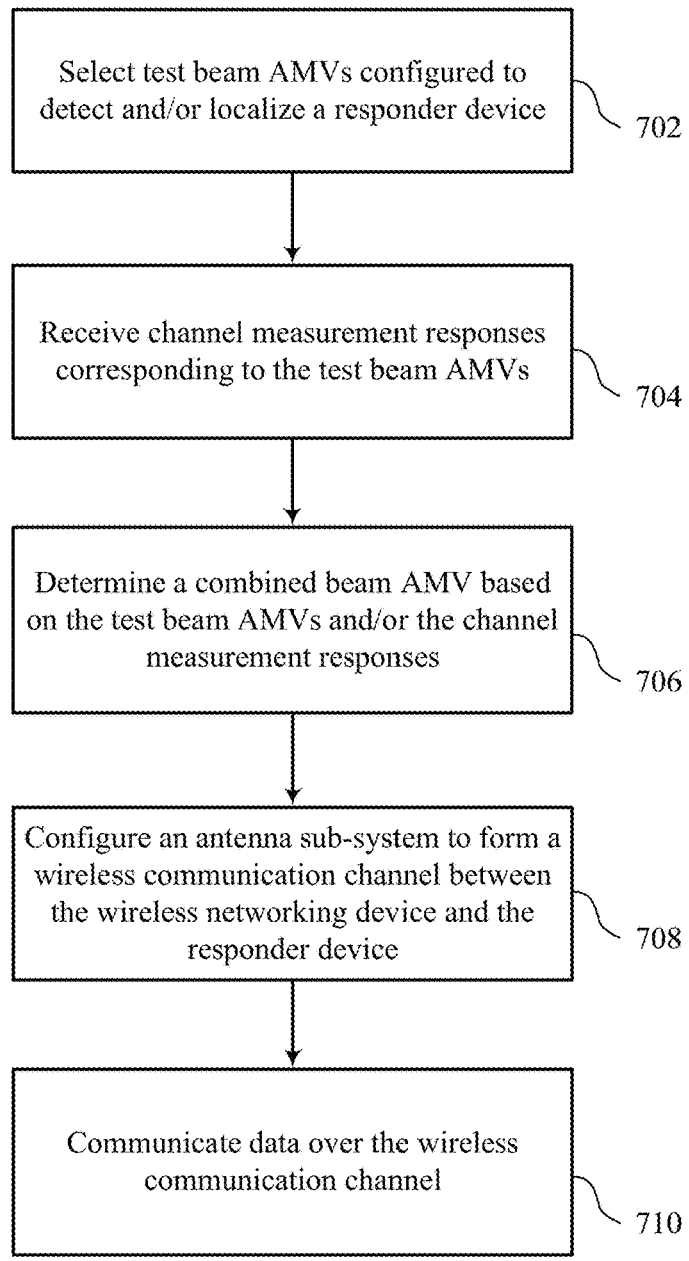
FIG. 7 illustrates an example of a process for forming a wireless communication channel using a wireless communication system incorporating an antenna isolation system.

FIG. 7 illustrates an example of a process 700 for forming a wireless communication channel using wireless communication system 300 incorporating one or more features of an antenna isolation system. In some implementations, the operations of FIG. 7 may be implemented as software instructions executed by one or more logic devices associated with corresponding electronic devices, sensors, and/or structures depicted in FIGS. 1 through 5. More generally, the operations of FIG. 7 may be implemented with any combination of software instructions and/or electronic hardware (e.g., inductors, capacitors, amplifiers, actuators, antennas, phase adjustors, amplifiers, or other analog and/or digital components). It should be appreciated that any step, sub-step, sub-process, or block of process 700 may be performed in an order or arrangement different from the implementations illustrated by FIG. 7. For example, in other implementations, one or more blocks may be omitted from process 700, and other blocks may be included. Furthermore, block inputs, block outputs, various sensor signals, sensor information, calibration parameters, and/or other operational parameters may be stored to one or more memories prior to moving to a following portion of process 700. Although process 700 is described with reference to systems 100, 100B, 100C, 300, and 500, and FIGS. 1A-5, process 700 may be performed by other systems and including a different selection of electronic devices, sensors, assemblies, and/or antenna arrangements. More generally, process 700 may be implemented according to any of the systems and methods described in U.S. patent application Ser. No. 15/419,929 filed on Jan. 30, 2017 and entitled "BEAMFORMING BASED ON ADJACENT BEAMS SYSTEMS AND METHODS," which is hereby incorporated by reference in its entirety. At the initiation of process 700, various system parameters may be populated by prior execution of a process similar to process 700, for example, or may be initialized to zero and/or one or more values corresponding to typical, stored, and/or learned values derived from past operation of process 700, as described herein.

At block 702, a logic device selects test beam antenna wave vectors (AWV)s configured to detect and/or localize a responder device. For example, controller 322 of initiator/transmitter device 320 may be configured to select a set of test beam AWVs configured to detect and/or localize responder/receiver device 330. In some implementations, controller 322 may be configured to select the set of test beam AWVs by adjusting one or more elements of a prior-determined combined beam AWV (e.g., determined by a prior execution of process 700, for example) by corresponding phase perturbation terms, for each test beam AWV in the set of test beam AWVs, where the phase perturbation terms, for each test beam AWV, are selected to produce a set of test beams, corresponding to the set of test beam AWVs, that are spatially distributed substantially within a selected angular diameter centered about the prior-determined combined beam AWV.

In other implementations, controller 322 may be configured to select the set of test beam AWVs by accumulating a temporal series of two or more prior-determined combined beam AWVs, extrapolating an estimated relative direction to the responder based, at least in part, on the temporal series of prior-determined combined beam AWVs, determining an estimated combined beam AWV corresponding to the estimated relative direction to the responder, and selecting the set of test beam AWVs such that a set of test beams corresponding to the set of test beam AWVs are spatially distributed substantially within a selected angular diameter centered about the estimated combined beam AWV. In some implementations, controller 322 may be configured to determine a width of the selected angular diameter and/or an angular and/or spatial distribution of the set of test beam AWVs based, at least in part, on the temporal series of two or more prior-determined combined beam AWVs, and to conform the set of test beam AWVs to a set of quantized phases supported by a phase shifter of the antenna subsystem.

In further implementations, controller 322 may be configured to select the set of test beam AWVs by receiving a set of responder test beam AWVs and/or a responder combined beam AWV from responder/receiver device 330 (e.g., determined through a prior execution of a process similar to process 700) and determining the selected set of test beam AWVs based on the set of responder test beam AWVs and/or the responder combined beam AWV received from responder/receiver device 330. In various implementations, controller 322 may be configured to use the antenna subsystem to form and scan through a set of test beams corresponding to the set of test beam AWVs prior to moving to block 704.

At block 704, a logic device receives channel measurement responses corresponding to test beam AWVs. For example, controller 322 of initiator/transmitter device 320 may be configured to receive one or more channel measurement responses corresponding to the set of test beam AWVs selected and/or formed at block 704. In some implementations, controller 332 of responder/receiver device 330 may be configured to provide the one or more channel measurement responses to initiator/transmitter device 320, responsive to the scan through of the set of test beams at block 702, using one or more wireless test channels formed according to/over one or more of the set of test beam AWVs selected at block 702, similar to wireless communication channel 350 as formed according to corresponding combined beam AWVs. Other wired or wireless channels may be used to convey channel measurement responses to initiator/transmitter device 320, including non-beamformed wireless channels, as described herein. In related implementations, controller 332 may be configured to receive the set of test beam AWVs from initiator/transmitter device 320, determine a combined beam AWV based on the set of test beam AWVs and corresponding channel measurements, and transmit the combined beam AWV to initiator/transmitter device 320 as at least a portion of the one or more channel measurement responses corresponding to the set of test beams scanned through by initiator/transmitter device 320 at block 702.

At block 706, a logic device determines a combined beam AWV based on the test beam AWVs and/or the channel measurement responses. For example, controller 322 of initiator/transmitter device 320 may be configured to determine a combined beam AWV directed substantially towards responder/receiver device 330 based, at least in part, on the plurality of test beam AWVs selected and/or formed at block 702 and the corresponding plurality of channel measurement responses received at block 704. In some implementations, determining the combined beam AWV may include determining individual weight factors corresponding to each of the test beam AWVs based, at least in part, on the channel measurement responses, and determining a vector sum of the set of test beam AWVs weighted according to their corresponding individual weight factors. In various implementations, each individual weight factor may be based on a complex conjugate of a corresponding channel measurement response.

In other implementations, determining the combined beam AWV may include determining a pseudoinverse AWV matrix based on the test beam AWVs and determining a vector sum based on the pseudoinverse AWV matrix, where vectors of the vector sum are rows or columns of the pseudoinverse AWV matrix each weighted according to individual weight factors corresponding to each of the test beam AWVs. In further implementations, determining the combined beam AWV may include determining a minimized mean square error (MMSE) AWV matrix based on the test beam AWVs and determining a vector sum based on the MMSE AWV matrix, where vectors of the vector sum are rows or columns of the MMSE AWV matrix each weighted according to individual weight factors corresponding to each of the test beam AWVs. In alternative implementations, receiving the one or more channel responses (e.g., block 704) and determining the combined beam AWV (e.g., block 706) may include receiving the combined beam AWV as channel measurement information included as at least a portion of the one or more channel measurement responses received at block 704 and extracting the combined beam AWV from the received one or more channel measurement responses.

At block 708, a logic device configures an antenna sub-system to form a wireless communication channel between the wireless communication device and the responder device. For example, controller 322 of initiator/transmitter device 320 may be configured to configure the antenna sub-system to form wireless communication channel 350 according to the combined beam AWV determined at block 706 between initiator/transmitter device 320 and responder/receiver device 330.

At block 710, a logic device communicates data over the wireless communication channel. For example, controller 322 of initiator/transmitter device 320 may be configured to communicate data or other signals over wireless communication channel 350 to responder/receiver device 330. In one implementation, controller 322 may be configured to transmit the set of initiator test beam AWVs selected at block 702 and/or the initiator combined beam AWV determined at block 706 to responder/receiver device 330. In such implementations, controller 332 of responder/receiver device 330 may be configured to iterate a portion of process 700 and select a set of responder test beam AWVs configured to localize the initiator device, receive a set of initiator channel measurement responses corresponding to the set of responder test beam AWVs, determine a responder combined beam AWV directed substantially towards initiator/transmitter device 320 based, at least in part, on the set of responder test beam AWVs and the corresponding set of initiator channel measurement responses, and configure an antenna sub-system to form wireless communication channel 350 according to the determined responder combined beam AWV between responder/receiver device 330 and initiator/transmitter device 320.

In related implementations, controller 332 of responder/receiver device 330 may be configured to determine the selected set of responder test beam AWVs based on the set of initiator test beam AWVs and/or the initiator combined beam AWV received from initiator/transmitter device 320. Controller 332 of responder/receiver device 330 may be configured to receive the set of initiator test beam AWVs and/or the initiator combined beam AWV from initiator/transmitter device 320 after transmitting the responder channel measurement responses received by initiator/transmitter device 320 at block 704. Controller 332 may also be configured to transmit a set of responder test beam AWVs and/or a responder combined beam AWV to initiator/transmitter device 320.

In various implementations, test beams may be formed in relation to a non-participating device, e.g., to determine potential interference that the non-participating device may cause between the initiator device and a responder device. If the non-participating device causes interference with a wireless communication channel between an initiator device and a responder device, then the non-participating device may be referred to as an interferee device. Alternatively, test beams may be formed in relation to a responder device, e.g., to determine the location of the responder device, as well as channel measurement information of a potential communication channel between the responder device and the transmitter device. In various implementations, at least two test beams are formed in relation to a responder device. The test beams may include those formed at locations that are within predefined proximities to the responder device.

Relatively simple implementations include omitting block 706 and instead determining an optimum one of the test beam AWVs selected at block 702 (e.g., based on the channel measurement responses received at block 604), then configuring the antenna sub-system to form a wireless communication channel according to the optimum test beam AWV.

Figure 8:
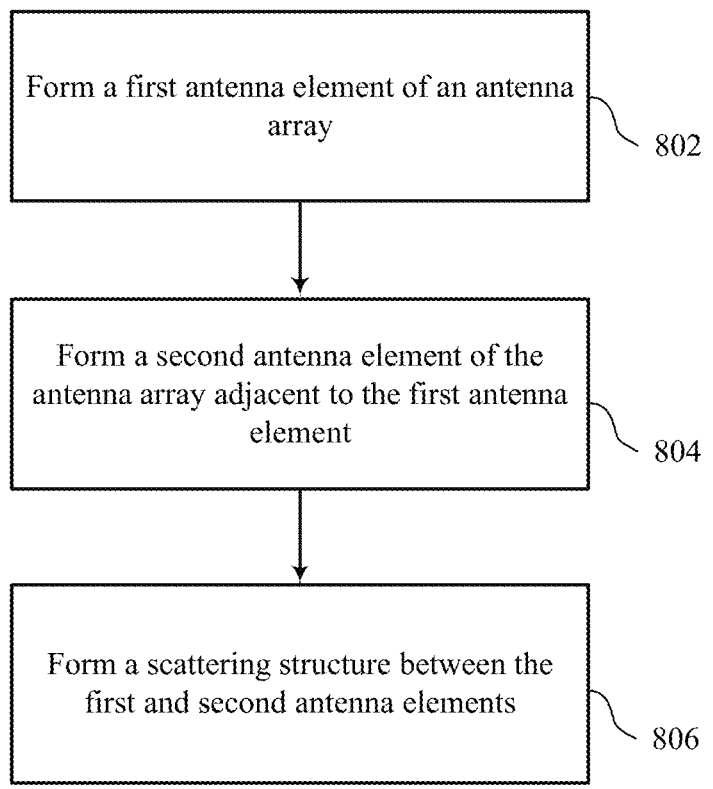
FIG. 8 illustrates an example of a process for forming an antenna isolation system.

FIG. 8 is a flow chart illustrating an example of a process 800 for forming an antenna isolation system. In some implementations, the operations of FIG. 8 may be implemented as software instructions executed by one or more logic devices associated with an integrated circuit and/or PCB patterning, fabrication, and/or assembly system. More generally, the operations of FIG. 8 may be implemented with any combination of software instructions and/or electronic hardware (e.g., inductors, capacitors, amplifiers, actuators, antennas, phase adjustors, amplifiers, other analog and/or digital components, deposition systems, etching or patterning systems, or other electronic or electrical fabrication systems). It should be appreciated that any step, sub-step, sub-process, or block of process 800 may be performed in an order or arrangement different from the implementations illustrated by FIG. 8. For example, in other implementations, one or more blocks may be omitted from process 800, and other blocks may be included. Furthermore, block inputs, block outputs, various sensor signals, sensor information, calibration parameters, and/or other operational parameters may be stored to one or more memories prior to moving to a following portion of process 800. Although process 800 is described with reference to systems 100, 100B, 100C, 300, and 500 and FIGS. 1-5, process 800 may be performed with respect to other systems and including a different selection of electronic devices, sensors, assemblies, and/or antenna arrangements. At the initiation of process 800, various system parameters may be populated by prior execution of a process similar to process 800, for example, or may be initialized to zero and/or one or more values corresponding to typical, stored, and/or learned values derived from past operation of process 800, as described herein.

At block 802, a first antenna element of an antenna array is formed. For example, a controller for a fabrication system may be configured to use the fabrication system to etch, print, or otherwise pattern one or more conductive metal layers of substrate 101 (e.g., which may be a multilayer substrate) to form antenna element 110. The controller may also be configured to use the fabrication system to pattern one or more dielectric layers of substrate 101 to form antenna element 110. In some implementations, antenna element 110 may be formed from substrate 101 as a planar antenna, as described herein. In other implementations, antenna element 110 may be formed by etching, machining, or otherwise patterning bulk conductive metal, for example, and the resulting structure electrically coupled or bonded to substrate 101.

At block 804, a second antenna element of an antenna array is formed. For example, the controller for the fabrication system used to form the first antenna element at block 802 may be configured to use the fabrication system to etch, print, or otherwise pattern one or more conductive metal layers and/or dielectric layers of substrate 101 to form antenna element 120, which may be a planar antenna, as described herein. More generally, the second antenna element (e.g., antenna element 120) may be formed using the same process used to form the first antenna element, and both the first and second antenna elements may be formed substantially concurrently (e.g., using a common patterning process). In some implementations, the processes used to form the first and second antenna elements may be different.

At block 806, a scattering structure is formed substantially between the first and second antenna elements. For example, the controller for the fabrication system used to form the first antenna element at block 802 and/or the second antenna element at block 804 may be configured to use the fabrication system to etch, print, or otherwise pattern one or more conductive metal layers and/or dielectric layers of substrate 101 to form scattering structure 140. In various implementations, scattering structure 140 may include one or more scattering elements disposed in a singular, parallel, mirror, or other arrangement, as described herein. Each scattering element may include one or more conductive metal layers coupled to each other by filled vias formed in substrate 101 by the fabrication system. More generally, the scattering structure (e.g., scattering structure 140) may be formed using the same process used to form the first and/or second antenna elements at blocks 802 and 804, and the scattering structure and the first and second antenna elements may be formed substantially concurrently (e.g., using a common patterning process). In some implementations, the processes used to form the scattering structure and/or different scattering elements of the scattering structure may be different from the processes used to form the first and/or second antenna elements. In various implementations, additional structures may be formed, using the same, similar, or different fabrication processes, to provide an antenna isolation system (e.g., antenna isolation system 100, 100B, and/or 100C). The resulting antenna isolation system may be used to form a relatively compact antenna array for a wireless communication device and/or an object sensing system, as described herein.

Thus, by providing antenna isolation systems including one or more scattering structures, implementations of the present disclosure provide relatively compact antenna arrays with antenna elements that are reliably isolated from each other across relatively wide frequency bands, which results in increases in both operating power levels and overall system sensitivity for devices integrated with such antenna isolation systems. Moreover, the increased operating power levels and overall system sensitivity allows implementations to form and maintain wireless communications networks and/or reliably detect objects using less power than that used by conventional methodologies, particularly as the size of the wireless networking device and/or its constituent antenna area is reduced to provide more compact devices.

Where applicable, various implementations provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Implementations described above illustrate but do not limit the invention. It should also be understood that numerous modifications and variations are possible in accordance with the principles of the present invention. Accordingly, the scope of the invention is defined only by the following claims.

What is claimed is:
1. A device comprising:
   a first antenna element of an antenna array configured to transmit or receive wireless transmissions;

a second antenna element of the antenna array adjacent to the first antenna element in the antenna array; and a scattering structure comprising a multilayer scattering element including a first conductive metal layer electrically coupled to a second conductive metal layer by at least one filled via, wherein the scattering structure is disposed substantially between the first and second antenna elements, wherein the scattering structure is configured to reduce electromagnetic coupling between the first and second antenna elements by, at least in part, directing electromagnetic radiation coupled through the first antenna element away from the second antenna element.

2. The device of claim 1, wherein:
the scattering structure comprises one or more scattering elements configured to reflect the electromagnetic radiation coupled through the first antenna element away from the second antenna element.

3. The device of claim 1, wherein:
the one or more scattering elements are further configured to reduce electromagnetic resonance between the first and second antenna elements.

4. The device of claim 1, wherein:
the first and second antenna elements comprise respective first and second planar antenna elements formed from a common substrate; and
the scattering structure is formed from the common substrate.

5. The device of claim 4, wherein:
the common substrate comprises a multilayer substrate;
the first and second planar antenna elements comprise respective first and second multilayer planar antenna elements formed from at least one common conductive metal layer of the multilayer substrate; and
the scattering structure is formed, at least in part, from the at least one conductive metal layer of the multilayer substrate.

6. The device of claim 1, wherein:
the first conductive metal layer of the multilayer scattering element is electrically coupled to the second conductive metal layer of the multilayer scattering element by a plurality of filled vias.

7. The device of claim 1, wherein:
the scattering structure comprises a plurality of scattering elements.

8. The device of claim 7, wherein:
the plurality of scattering elements is arranged in one of: a parallel arrangement, a mirror arrangement, a singular arrangement, or a combination thereof.

9. The device of claim 1, further comprising:
a first plurality of antenna elements comprising the first antenna element; and
a second plurality of antenna elements comprising the second antenna element, wherein the scattering structure is configured to reduce electromagnetic coupling between the first plurality of antenna elements and the second plurality of antenna elements by, at least in part, directing electromagnetic radiation coupled through the first plurality of antenna elements away from the second plurality of antenna elements.

10. A method for detecting an object, comprising:
designating a plurality of transmitter and receiver channels for a transmitter antenna array and a receiver antenna array of an object sensing system, wherein a scattering structure is disposed substantially between the transmitter antenna array and the receiver antenna array;

scanning the transmitter antenna array and the receiver antenna array through the designated channels to measure channel responses corresponding to each one of the designated channels; and
determining a directional vector to or from an object scanned by at least one of the designated channels based, at least in part, on the measured channel responses.

11. The method of claim 10, further comprising:
forming a measurement matrix comprising entries corresponding to each measured channel response, wherein the designating the plurality of transmitter and receiver channels comprises:
forming a transmitter amplitude weight vector (AWV) matrix comprising one or more transmitter AWVs corresponding to each transmitter channel in the plurality of transmitter and receiver channels, and
forming a receiver AWV matrix comprising one or more receiver AWVs corresponding to each receiver channel in the plurality of transmitter and receiver channels.

12. A wireless communication device, comprising:
an antenna sub-system configured to transmit beamformed wireless transmissions, wherein the antenna sub-system comprises a first antenna element, a second antenna element adjacent to the first antenna element, and a scattering structure comprising a multilayer scattering element including a first conductive metal layer electrically coupled to a second conductive metal layer by at least one filled via, wherein the scattering structure is disposed substantially between the first and second antenna elements, wherein the scattering structure is configured to reduce electromagnetic coupling between the first and second antenna elements by, at least in part, directing electromagnetic radiation coupled through the first antenna element away from the second antenna element;
a controller configured to communicate with the antenna sub-system; and
a memory configured to store a plurality of computer readable instructions which when executed by the controller are adapted to cause the system to:
select a plurality of test beam antenna weight vectors (AWVs) configured at least to detect, to localize, or to detect and localize a responder device;
receive one or more channel measurement responses corresponding to the plurality of test beam AWVs;
determine a combined beam AWV directed substantially towards the responder device based, at least in part, on the plurality of test beam AWVs and the corresponding one or more channel measurement responses; and
configure the antenna sub-system to form a wireless communication channel according to the determined combined beam AWV between the wireless networking device and the responder device.

13. The wireless communication device of claim 12, wherein the determining the combined beam AWV comprises:
determining individual weight factors corresponding to each of the plurality of test beam AWVs based, at least in part, on the one or more channel measurement responses; and
determining a vector sum of the plurality of test beam AWVs weighted according to their corresponding individual weight factors.

14. The wireless communication device of claim 12, wherein:

characteristics of the scattering structure are configured substantially to reflect the electromagnetic radiation coupled through the first antenna element away from the second antenna element and to substantially eliminate risk of resonance with the electromagnetic radiation coupled through the first antenna element.

* * * * *